(12) United States Patent
Santeler

(10) Patent No.: US 8,517,058 B1
(45) Date of Patent: Aug. 27, 2013

(54) LEAN DUCT FABRICATION

(76) Inventor: Leslie Edward Santeler, Mt. Prospect, IL (US)

( * ) Notice: Subject to any disclaimer, the term of this patent is extended or adjusted under 35 U.S.C. 154(b) by 71 days.

(21) Appl. No.: 13/286,385

(22) Filed: Nov. 1, 2011

(51) Int. Cl.
*F15D 1/04* (2006.01)

(52) U.S. Cl.
USPC ............... 138/39; 138/37; 285/179; 285/183

(58) Field of Classification Search
USPC .................. 138/37, 39; 285/179, 183
See application file for complete search history.

(56) References Cited

U.S. PATENT DOCUMENTS

| | | | |
|---|---|---|---|
| 193,847 A | | 3/1877 | Choate |
| 1,921,056 A * | | 8/1933 | Walker ........................... 285/179 |
| 1,996,596 A * | | 4/1935 | Smith, Jr. ........................ 138/39 |
| 2,183,174 A * | | 12/1939 | Smith ............................. 138/39 |
| 2,215,318 A * | | 9/1940 | Bristol ..................... 285/148.22 |
| 2,297,979 A * | | 10/1942 | Peck ................................ 138/39 |
| 2,359,579 A * | | 10/1944 | Peck ................................ 138/37 |
| 2,590,797 A | | 2/1950 | Siciliano |
| 2,826,221 A * | | 3/1958 | Speiser ........................... 138/39 |
| 2,959,195 A * | | 11/1960 | Gracer ............................ 138/39 |
| 3,074,459 A * | | 1/1963 | Pavia ............................. 72/129 |
| 3,494,379 A * | | 2/1970 | Hinden .......................... 138/39 |
| 3,602,262 A * | | 8/1971 | Hinden .......................... 138/39 |
| 4,841,616 A | | 6/1989 | Whtiney |
| 4,911,205 A * | | 3/1990 | Myers ............................ 138/39 |
| 5,878,786 A * | | 3/1999 | Elder ............................ 138/163 |
| 6,244,300 B1 * | | 6/2001 | Pacana ........................... 138/39 |
| 8,276,619 B2 * | | 10/2012 | Morton et al. .................. 138/38 |
| 2004/0050487 A1 | | 3/2004 | Frantz et al. |
| 2005/0283977 A1 | | 12/2005 | Eberly |
| 2008/0229800 A1 | | 9/2008 | Santeler |

* cited by examiner

*Primary Examiner* — Patrick F Brinson

(57) ABSTRACT

Segmented ductwork fittings shaped to minimize waste and labor while retaining the performance characteristics of traditional radius fittings. Lean Duct fittings utilize both curved sections and straight tubular sections at an angle to one another to provide a predetermined change in the direction or location of fluid flow through the finished duct system.

2 Claims, 20 Drawing Sheets

LEAN DUCT RADIUS CONNECTOR
708

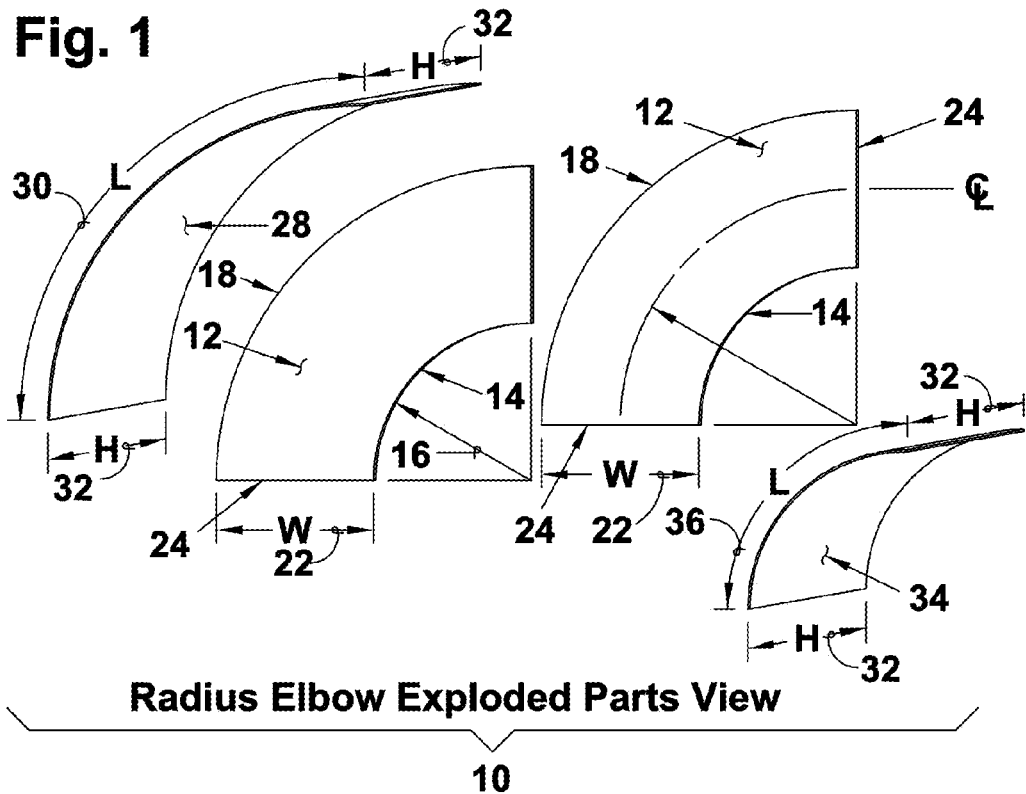
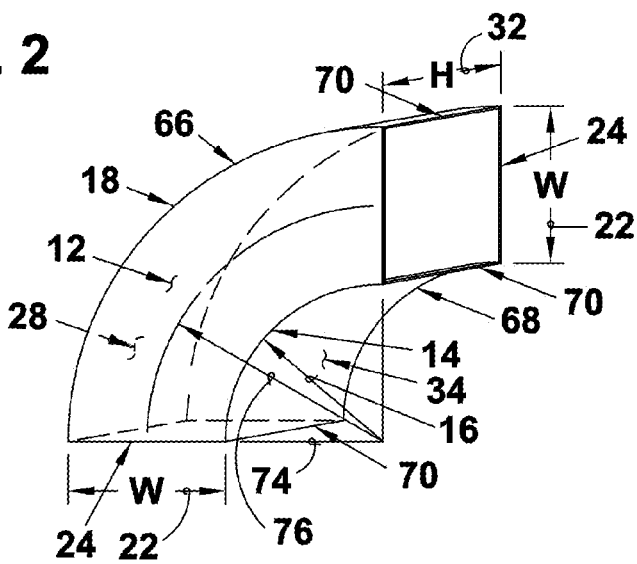
PRIOR ART

Rectangular Straight Duct Exploded Parts View
20

Assembled Rectangular Straight Duct
20

PRIOR ART

Short Radius Elbow
210

PRIOR ART

Rectangular Square Elbow Exploded Parts View
110

Assembled Square Elbow
110

PRIOR ART

Single Width Turn Vane Assembly
342

PRIOR ART

Straight Duct Cut into 2-Piece Mitered Elbow Sections
510

Assembled 2-Piece Rectangular Elbow
510

Scrapless Fabrication Elbow  PRIOR ART

Straight Duct Cut Into 3-Piece Rectangular Elbow Mitered Sections
512

Assembled 3-Piece Mitered Square Elbow
512

Scrapless Fabrication Elbow    PRIOR ART

LEAN DUCT RADIUS CONNECTOR
708

**LEAN DUCT RADIUS CONNECTOR INSERTED
BETWEEN 2 MITERED ELBOW SEGMENTS**

710

SMOOTH LEAN DUCT SHAPE TEST ELBOW

LEAN DUCT RADIUS CONNECTORS INSERTED
BETWEEN 3 MITERED ELBOW SEGMENTS
715

SMOOTH LEAN DUCT SHAPE TEST ELBOW
610

**SUPPLY SYSTEM TEST SET-UP
DUCTWORK UNDER POSITIVE PRESSURE**

RETURN / EXHAUST SYSTEM TEST SET-UP
DUCTWORK UNDER NEGATIVE PRESSURE

STRAIGHT SUPPLY SYSTEM TEST SET-UP
DUCTWORK UNDER POSITIVE PRESSURE

Exploded Parts View Lean Duct Radius Connector
708

Assembled Radius Duct Connector
708

ILLUSTRATION OF A 45° LEAN DUCT RADIUS CONNECTOR
JOINING TWO DUCT TUBES MITERED AT 45° ANGLES

Straight Duct Mitered into 3 Piece Offset Sections

Lean Duct Radius Connectors Inserted Between 3 Mitered Offset Segments

LEAN DUCT OFFSET FITTING

LEAN DUCT FABRICATION

This application is based on Provisional Application No. 61/446,820, filed Feb. 25, 2011, the priority of which is claimed.

FIELD OF THE INVENTION

The present invention is generally related to rectangular ventilation ductwork and material-conveying ductwork, said material being typically gaseous or granular.

BACKGROUND OF THE INVENTION

In the days of using pot-bellied stoves to heat homes, simple round ductwork was used to convey the noxious fumes and smoke out of house. The house itself was leaky enough to bring in fresh outdoor air. Such early ducts were hand-made, often out of tin, which is less corrosive than steel, hence the early duct fabricators were called tin-knockers.

Today, with the advent of galvanization, most general-purpose building ducts are made of galvanized steel "sheet metal," so called because it is produced in thin sheets of standardized gauges. Specialty ducts are made of various materials such as fiberglass, aluminum, black iron, stainless steel, etc., but the installers are still called tin knockers or tinners.

With today's tight building structures, central heating and cooling systems supply air to and exhaust air from multiple rooms on multiple levels. Ducts are heavily engineered systems, used to supply fresh outdoor air to the building interiors, to exhaust fumes and odors to the outside, and to distribute comfort air to all occupants. Specialty systems such as toilet exhaust, laundry exhaust, or fume hood exhaust are engineered and built separately from the general building exhaust and supply. Duct design has become an engineering specialty.

To reach all areas of he building, ductwork must be constructed with numerous bends and offsets changing direction, elevation, or size or any combination thereof.

Because different volumes of air are delivered to different spaces, the size of the ductwork changes in proportion to the volume of air delivered to or exhausted from various spaces. The piece of ductwork between ductwork runs of different sizes or different directions is called a change fitting.

In supply systems generally, central fans emit conditioned air at a given velocity and pressure and as the length of the ductwork increases, the static pressure of the air drops. Fans must be selected to provide sufficient pressure to force the air stream to the end of the duct system. In addition, every bend or change in the duct size further increases the static pressure requirement of the fan. Fans must be sized large enough to deliver air to the farthest reach of the ductwork system. Exhaust systems are sized similarly, with the ducts increasing in size as they approach the exhaust fan.

A ductwork design engineer must attempt to use the smallest duct possible to keep the cost of material low. However, he or she must avoid frequent changes in duct sizes to keep the cost of the duct fabrication and installation low. At the same time, the engineer must size the fan to the minimum horsepower possible to keep the initial cost of the equipment and the operating costs of the equipment at a minimum. Larger equipment also utilizes valuable floor space in equipment rooms. Equipment rooms are not rentable space, so building owners would prefer to allot as little space to mechanical equipment as possible.

Traditionally, "radius elbows" and "radius offsets" are believed to cause a much lower drop in static pressure than "square throat elbows" and "angled offsets." Design engineers will typically insist on the installation of radius fittings to reduce the system pressure drop and thus allow the installation of smaller equipment.

However, despite computerized design, plasma cutting, and automated bending, the final duct shape is still largely constructed in traditional fashion and installed on the job site by hand. Constructing and installing the radius fittings is the most time-consuming aspect in the ductwork fabrication and installation process, and hence one of the most costly.

Further, despite the computerized optimization of the cutting layout of the fittings from the flat stock sheet metal, traditional radius fittings of all types still result in unacceptable wasted flat stock. The waste material is scrap metal.

The Scrapless Fabrication method or process of manufacturing or fabricating ductwork offsets, elbows, tees, wyes, transitions and change fittings from sheet metal materials is a novel and inventive manner of performing the work that substantially reduces waste material and fabrication inefficiencies. This method is described in U.S. patent application Ser. No. 11/688,544, which is incorporated herein. The Scrapless Fabrication method eliminates the waste resulting from cutting fitting patterns from standard size material sheets and coils of sheet metal materials and simplifies the final hand fabrication, assembly and installation of those fittings. Despite testing results, Scrapless Fabrication fittings may not satisfy traditionally trained engineers' concerns about the pressure losses associated with non-radius fittings.

It is an object of the invention described herein to provide a "Lean Duct Manufacturing" system that substantially decreases the waste produced in the conventional radius fabrication method, substantially simplifies the hand labor required for the final fabrication and installation of ductwork fittings, and provides flow characteristics, including pressure drop, substantially equivalent to standard radius fittings. The low pressure drop of the Lean Duct Manufacturing system reduces the fan size required to distribute or exhaust air and fumes, resulting in lower initial equipment costs and reduced energy costs for the life of the system.

Buildings utilizing the Lean Duct Manufacturing system may be eligible to obtain LEED certification, because the Lean Duct Manufacturing system may be applied to certain credits.

The improved flow characteristics of the Lean Duct Manufacturing fittings lower the pressure drop, which in turn requires smaller fans that use less energy. Reduction in energy usage is applicable to both LEED NC Prerequisite EA 2—Minimum Energy Performance and LEED NC Credit EA 1—Optimize Energy Performance.

To fit field conditions, ductwork is frequently fabricated on a construction site. Fabrication of Lean Duct Manufacturing fittings produces less construction waste. The reduced waste generation is applicable to LEED NC Credits M-1 and MR-2—Divert Construction Waste from Disposal. Intent of this credit is to divert construction and demolition debris from disposal in landfills and incinerators and to redirect recovered resources back to the manufacturing process or to appropriate sites for re-use. At present, recycling small pieces of scrap sheet material from a construction site is not done. Lean Duct Manufacturing reduces the overall percentage of non-recyclable waste.

Easy on-site assembly allows Lean Duct Manufacturing fittings to be transported to the job site in knocked-down condition, resulting in reduced transportation costs from one-quarter to $\frac{1}{20}$ of the cost of transporting traditional pre-fabricated duct, depending on the finished size of the duct.

Conventional wisdom has been that only a smooth continuously curved elbow provides an acceptable amount of resistance to air flow when changing the direction of the airflow. Yet test results unexpectedly show that the Lean Duct method yields similar resistance to change in airflow at substantially lower costs and substantially greater ease of manufacturing with almost zero waste.

Lean Duct Manufacturing changes, or re-engineers, the way ductwork and change fittings are manufactured, the way individual fittings and entire ductwork systems or products can be designed to reduce waste and increase efficiencies, and most importantly, the way of doing business.

The consequences of those changes from conventional methods are significant enhancements or improvements in both fabrication and installation or assembly efficiencies. The unprecedented reductions in waste material contributes to environmental sustainability by ultimately reducing the effect of energy usage on mining operations, sheet metal material production, sheet metal fitting fabrication, and the final product and systems installation.

The new method eliminates the arbitrary nature of the custom and practice approach to the work that results in an infinite variety of fitting length and shape types by reducing the options to a set of consistent pre-determined standards, reduces the cost of construction contributing to affordable homes and offices, and provides new job opportunities for unskilled workers.

SUMMARY OF INVENTION

The present invention relates to fabricating duct change fittings such as elbows and offsets with reduced waste. To achieve a change in direction, traditional ductwork fittings were constructed of continuously curved pieces. The curved pieces resulted in much waste in material and required skilled craftsmen to join the pieces together properly. The Lean Duct method may use short, curved connectors and angled cuts on straight joints of duct to achieve the change in direction with little waste in fabrication and easier joining. The resultant fitting is curved only in a portion of the overall fitting.

A typical Lean Duct manufacturing elbow may have one Connector in the center section of the fitting with the straight portions of the fitting cut at an angle to form a complete 45 or 90-degree change in direction. Alternatively, elbows may have multiple straight sections and multiple connectors to form even smoother changes in direction. This method allows for a smooth transition using only short connectors and eliminating large curved pieces that are difficult to fit together and wasteful to cut. It is possible to construct other configurations that result in a segmented fitting with a generally central curved portion and associated straight portions although not all such configurations are illustrated herein.

Using Lean Duct connectors and Scrapless Fabrication Manufacturing-type duct cuts, any degree change in direction can be achieved. A 30-degree change results from a 15-degree cut, a 45-degree change results from a 22.5-degree cut, etc, when one Connector is used. A 60-degree change results from a 15-degree cut, a 90-degree change results from a 22.5-degree cut, etc, when two Connectors are used.

Lean Duct connectors eliminate the need for pre-measuring and prefabricating an expensive elbow in the shop. Instead, connectors can be rapidly put together in the field by unskilled workers and installed to fit exactly in the correct locations. Expensive, incorrectly prefabricated elbows with expensive turning vanes need not be thrown in the scrap heap. Various combinations of connectors, straight duct sections, and angled ducts can be combined to form almost any directional change fitting required.

Lean Duct Connectors can be fabricated from standardized Lean Duct strips of material. The straight portions of the lean duct fittings can be cut in the shop using predetermined ducting patterns (see patent application Ser. No. 11/688,544), but they can also be cut in the field, using straight duct sections. This eliminates the costly method of installing the duct system on-site up to the point where a fitting is needed, telephoning the dimensions into the fabrication shop, and then waiting a few days to a week for the finished fitting to arrive at the job site.

BRIEF DESCRIPTION OF THE DRAWINGS

FIG. 1 is an exploded view of a prior art radius elbow.

FIG. 2 represents the same prior art radius elbow, assembled.

DETAILED DESCRIPTION OF THE ILLUSTRATED EMBODIMENTS

Figure 3:
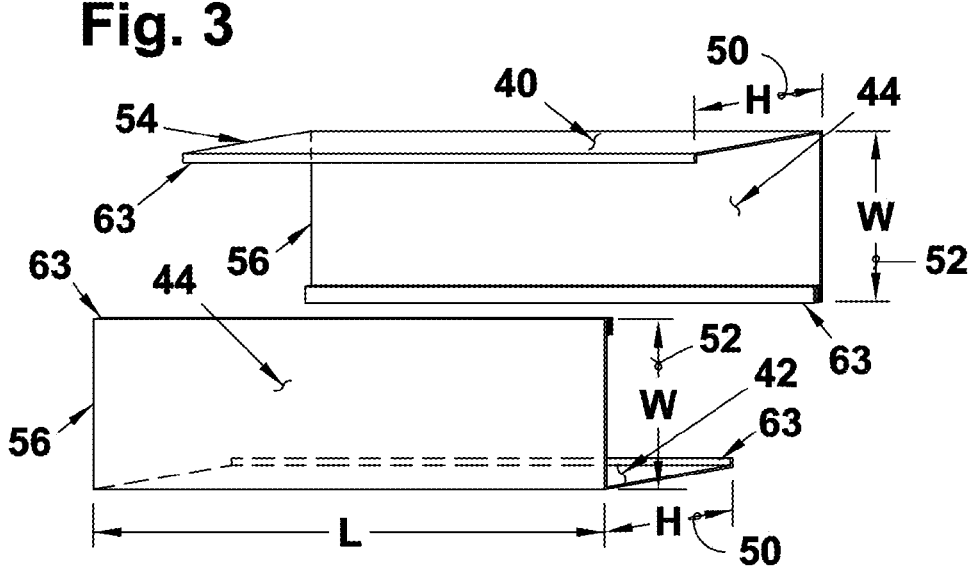
FIG. 3 is an exploded view of a piece of straight duct, known as a duct joint.

To illustrate the differences between the Lean Duct Manufacturing fittings and traditional angled fittings, included below is a description of traditional elbows and the method of making same, followed by a detailed description of various embodiments of the present invention. Although all the illustrations are of 45 or 90-degree elbows, it is understood that the Lean Duct Manufacturing may be used to produce any angled fittings such as transitions, offsets, and elbows of various angles. Specific details disclosed herein are not to be interpreted as limiting, but merely as a basis for the claims and as a representative basis for teaching one skilled in the art to construct and use the present invention in any appropriate manner.

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Similarly, change fittings illustrated herein use one or two radius connectors each, but multiple connectors can be used to provide the transition desired.

Similarly, the term "sheet metal" is used as a representative material, but the ducts may be constructed of any semi-rigid material such as fiberglass, black iron, stainless steel, etc. The semi-rigid material must be stiff enough to hold its shape under the working pressure of the internal fluid being conveyed and yet flexible enough to be bent to the shapes required, as described below. Widths and sizes shown of the base material and the finished fittings are for illustrative purposes only; the invention can be used in any size, limited by the dexterity of the workers and the flexibility of the material.

Where possible, like numbers have been used to label like parts.

FIG. 1 shows a traditional radius elbow 10 of rectangular duct construction. The traditional radius elbow 10 is constructed of two identical flat faces 12 cut into curved shapes such that each face 12 has an inside boundary arc 14 in the shape of an arc of a circle of radius 16, said arc 14 subtending a predetermined number of degrees at the center of the circle. Each face 12 also has an outside boundary arc 18 in the shape of an arc of a circle subtending the same number of degrees as arc 14 and with the same center point as arc 14. Boundary arcs 14 and 18 are separated by width 22, such that each face 12 is also bound by two straight edges 24. Thus the radius of the circle defined by arc 18 is equal to the radius 16 of the inside arc 14 plus width 22. Edges 24 and arcs 14 and 18 comprise the finished boundaries of faces 12.

Each traditional elbow 10 also has a heel 28, which is a rectangular piece of sheet metal such that the heel length 30 is equal to the length of outside arc 18. The span 32 of heel 28 varies with design requirements and is traditionally denoted on drawings as "H," or Height, regardless of the installed orientation of the duct, in order to differentiate the span 32 of the rectangular heel 28 of the elbow 10 from the width 22 of the curved faces 12 of the elbow 10.

Each traditional elbow 10 also has a throat 34, which is a rectangular piece of sheet metal, such that throat length 36 equals the length of inside arc 14. The span 32 of throat 34 equals the heel span 32.

Not shown for clarity are seam allowances on all four sides of each piece. When seam allowances are used for joining duct sections together, these seam allowances are typically ⅓ inch to 1½ inch wide, making the as-cut dimensions of each piece ⅔ inches to three inches larger than the illustrated finished dimensions in both directions.

FIG. 2 illustrates a finished elbow 10, wherein the faces 12, heel 28, and throat 34 are joined together. To assemble the radius fitting, the heel 28 and throat 34 are bent to align with the outside boundary arc 18 and inside boundary arc 14 respectively. Boundary arcs 18 are joined to heel boundaries 66 to form a seam. Boundary arcs 14 are similarly joined to throat boundaries 68 to form seams. Seams may be formed using any traditional method such as Pittsburgh lock seam. Because heel 28 and throat 34 are bent to match the curved boundaries 14 and 18, the resultant seam is curved, and the joining typically involves hand crimping to achieve a flat seam. When assembled, as shown in FIG. 2, the radius elbow 10 has opening dimensions of heel span 32 by face width 22, with four open edges 24 and 70 on each end (two each). The assembled elbow 10 has an inside radius, known as the throat radius 74 equal to the inside radius 16. Midway between the inside radius 16 and the outside radius defined by boundary arc 18 is the centerline radius 76.

Traditional specifications require that for proper airflow characteristics, throat radius 74 must equal width 22. Thus, centerline radius 76 must equal one and half times width 22.

FIG. 3 is an exploded view of a traditional straight duct joint 20. The straight joint 20 of duct shown has a top face 40, a bottom face 42, and two side faces 44. The top face 40 and bottom face 42 are the same size, with edges 54 having a finished dimension H (span 50) equal in this instance to span 32 of the heel 28 and throat 34 of the radius elbow 10 (FIG. 2). The side faces 44 are both the same size, with edges 56 in this instance having a finished dimension W (width 52) equal to width 22 of the curved side faces 12 of the radius elbow 10 (FIG. 2).

As on all the fittings to be discussed here, each edge of the sheet metal pieces may have a seam allowance, which may vary in size. Longitudinal seam allowances 63 are illustrated in FIG. 3. These are used to join the pieces of the joint 20 itself together. Not illustrated are seam allowances on edges 54 and 56, which may be used to connect the joint 20 to additional pieces of ductwork.

Figure 4:
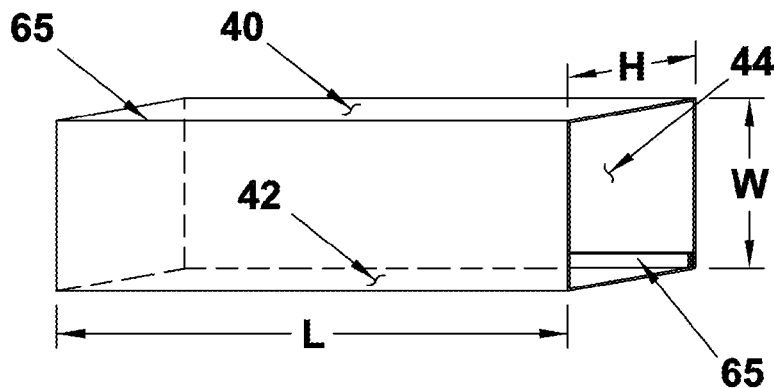
FIG. 4 represents the same duct joint, assembled.

FIG. 4 illustrates an assembled joint 20. As illustrated, joint 20 is constructed from two individual pieces of sheet metal. Depending on the size of the duct, the top face 40, bottom face 42, and side faces 44 may be constructed from a single bent piece of sheet metal, from two bent pieces, or from four or more separate pieces, all joined at seams to form a rectilinear joint 20. The seams 65 are formed by any traditional longitudinal seam joining method, such as Pittsburgh lock seam.

Note that all edges in FIGS. 1, 2, 3, and 4 may have a seam allowance (not shown) on the open end of the finished piece. For example, a seam allowance may be along edges 24 and 70 in FIGS. 1 and 2, and along edges 54 and 56 in FIGS. 3 and 4. Similarly, each individual piece comprising top faces 40, bottom faces 42, and side faces 44 may have longitudinal seam allowances such as allowance 63 (FIG. 3) to allow the piece to be joined into an assembled fitting.

Figure 5:
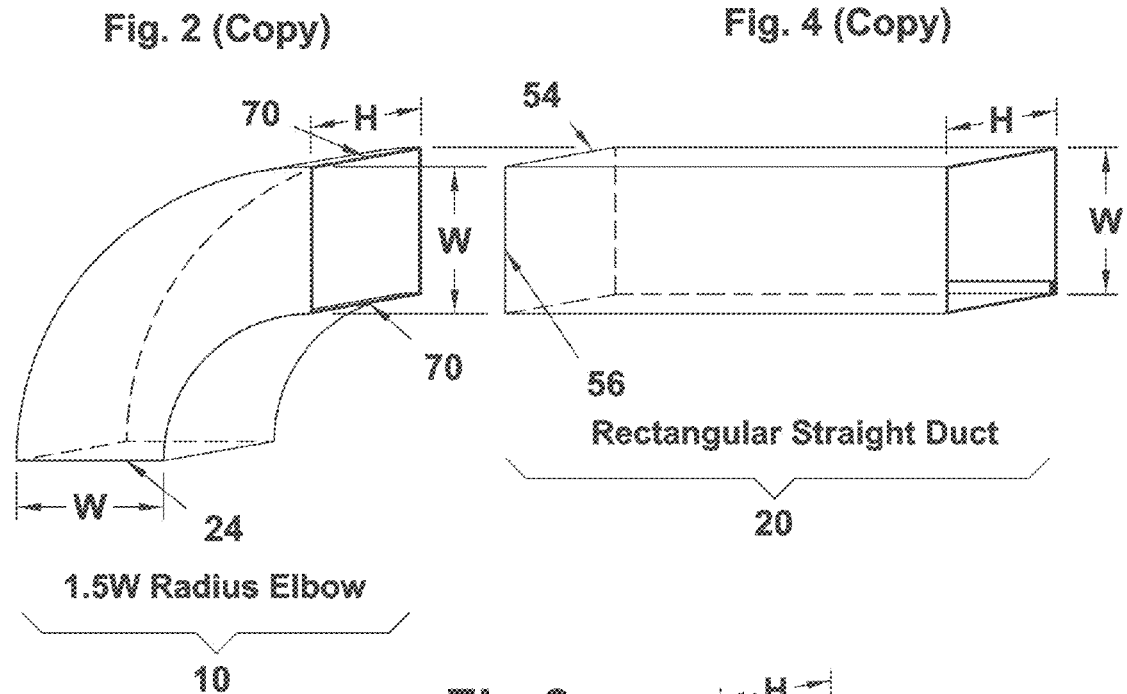
FIG. 5 illustrates how a traditional radius elbow is connected to a straight duct joint.

FIG. 5 illustrates how a traditional radius elbow 10 is connected to a straight joint 20 of duct. In practice, the finished radius elbow 10 is joined to straight joints 20 of duct at both of its ends, matching the seam allowances (not shown) along edges 24 and 70 on the ends of the elbow 10 to the seam allowances along edges 54 and 56 of straight joints 20, using any transverse joining method known in the art, such as slip drive. The type of joining method determines the width of seam allowance required, if any. The type of transverse connection varies with the pressure classification of the duct.

Figure 6:
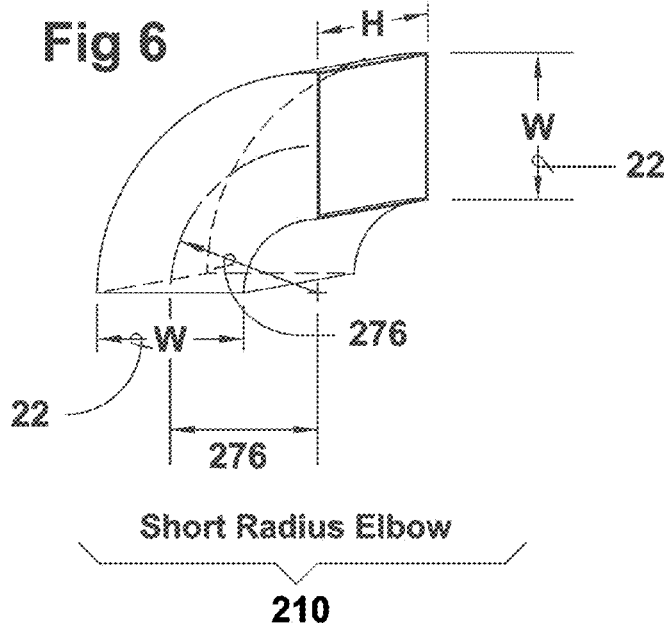
FIG. 6 illustrates a prior art short radius elbow.

FIG. 6 illustrates a prior art short radius elbow 210. Elbow 210 is constructed similarly to elbow 10 (FIG. 2), the traditional full radius elbow, but the centerline radius 276 is reduced to equal width 22, not one and a half times width 22 as in the traditional radius elbow 10.

Figure 7:
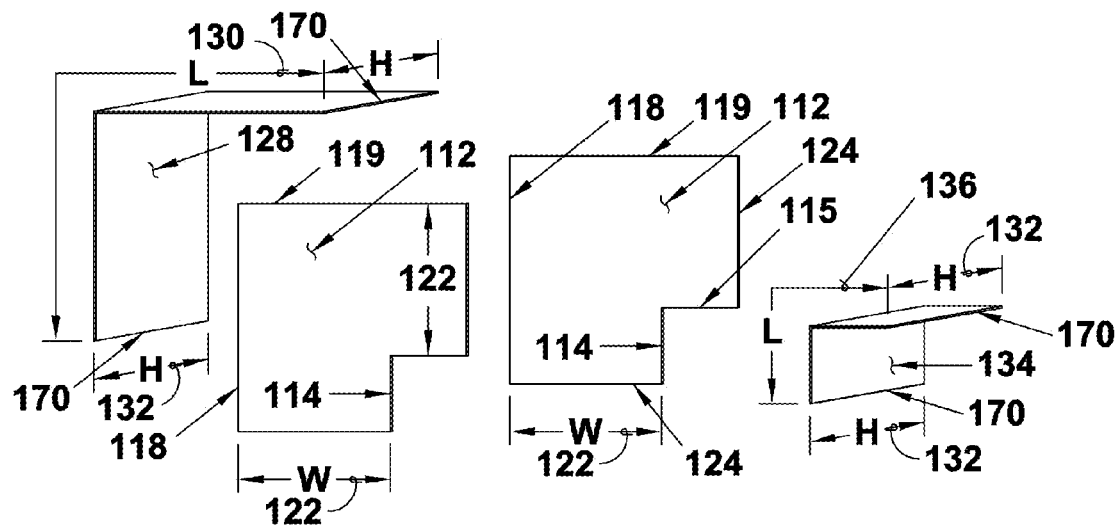
FIG. 7 is an exploded view of a prior art square throat elbow.

FIG. 7 is an exploded view of a traditional prior art square throat 90-degree elbow 110. For illustration, this square throat elbow 110 is sized to join with the same straight joint 20 of duct illustrated in FIG. 4.

Square throat elbow 110 is manufactured from two identical flat side faces 112. Each side face 112 has two inside boundaries 114 and 115. Depending on the requirements of the installation, lengths of boundaries 114 and 115 are typically identical, but it is not necessary that they be identical.

Each side face 112 has two edges 124, both with a width 122. To fit the straight duct joint 20 illustrated in FIG. 4, width 122 is equal to width 52 (FIG. 4).

Each thee 112 has two outside boundaries 118 and 119. The length of boundary 118 is equal to the length of throat boundary 114 plus width 122. Similarly, the length of boundary 119 is equal to the length of throat boundary 115 plus width 122. in many cases, boundaries 118 and 119 are the same length, but may be different lengths as required by the particular installation.

Each traditional square throat elbow 110 also has a heel 128, which is a rectangular piece of sheet metal with heel length 130. Finished heel length 130 is equal to the sum of the lengths of outside boundary 118 and outside boundary 119. The heel 128 also has two edges 170, of dimension H or span 132. To fit the straight duct joint 20 illustrated in FIG. 4, span 132 is equal to span 50 (FIG. 3).

Each traditional square throat elbow 110 also has a throat 134, which is a rectangular piece of sheet metal with throat length 136. Finished throat length 136 is equal to the sum of the lengths of throat boundaries 114 and 115. The throat 134 also has two edges 170 of span 132.

As with the radius elbow 10, both side faces 112, the heel 128, and throat 134 may have seam allowances (not shown) used for joining the pieces together.

Figure 8:
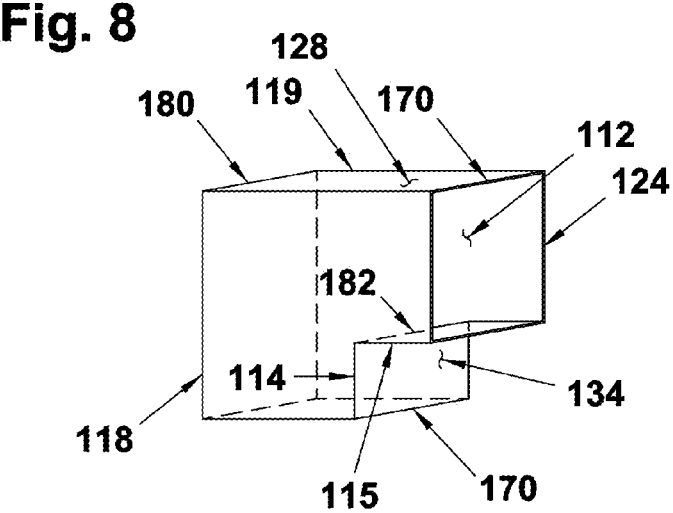
FIG. 8 represents the same prior art square throat elbow, assembled.

FIG. 8 illustrates a finished square throat elbow 110. Heel 128 is bent along bend line 180 to match boundaries 118 and 119. Throat 134 is bent along bend line 182 to match boundaries 114 and 115. The heel 128 and throat 134 are joined to side faces 112 using any conventional longitudinal seaming method. The finished piece illustrated in FIG. 8 may have seam allowances (not shown) along unfinished edges 124 and 170. These are used to join the finished elbow 110 to the straight joint 20 (FIG. 4), similar to the joining of traditional radius elbow 10 to joint 20 (FIG. 5).

Figure 9:
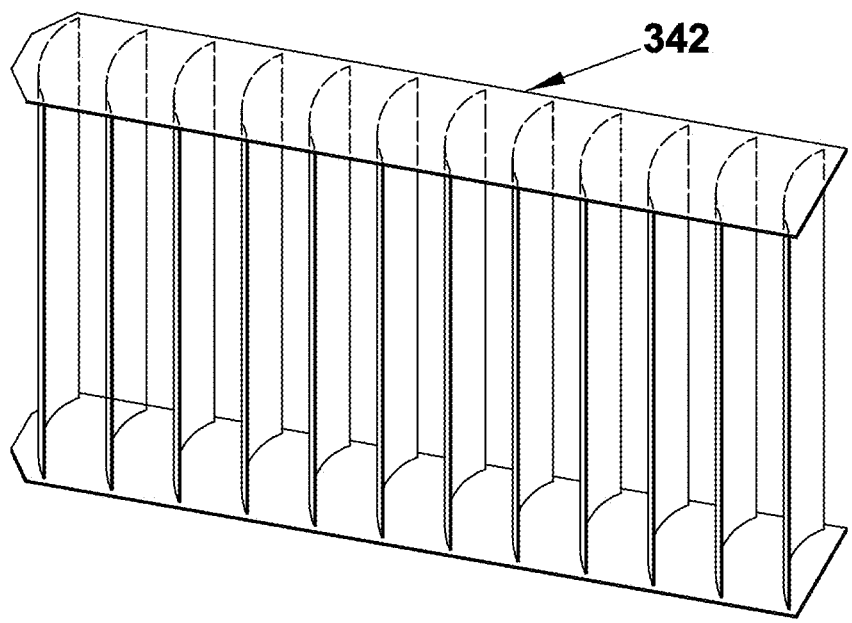
FIG. 9 illustrates a typical manufactured set of prior art turning vanes.

FIG. 9 is an example of a set of manufactured single skin turning vanes 342. Several manufacturers prefabricate turning vanes for different sizes of ducts. Design engineers may require vanes 342 to be installed inside elbows, particularly square throat elbows, to reduce static pressure loss.

Figure 10:
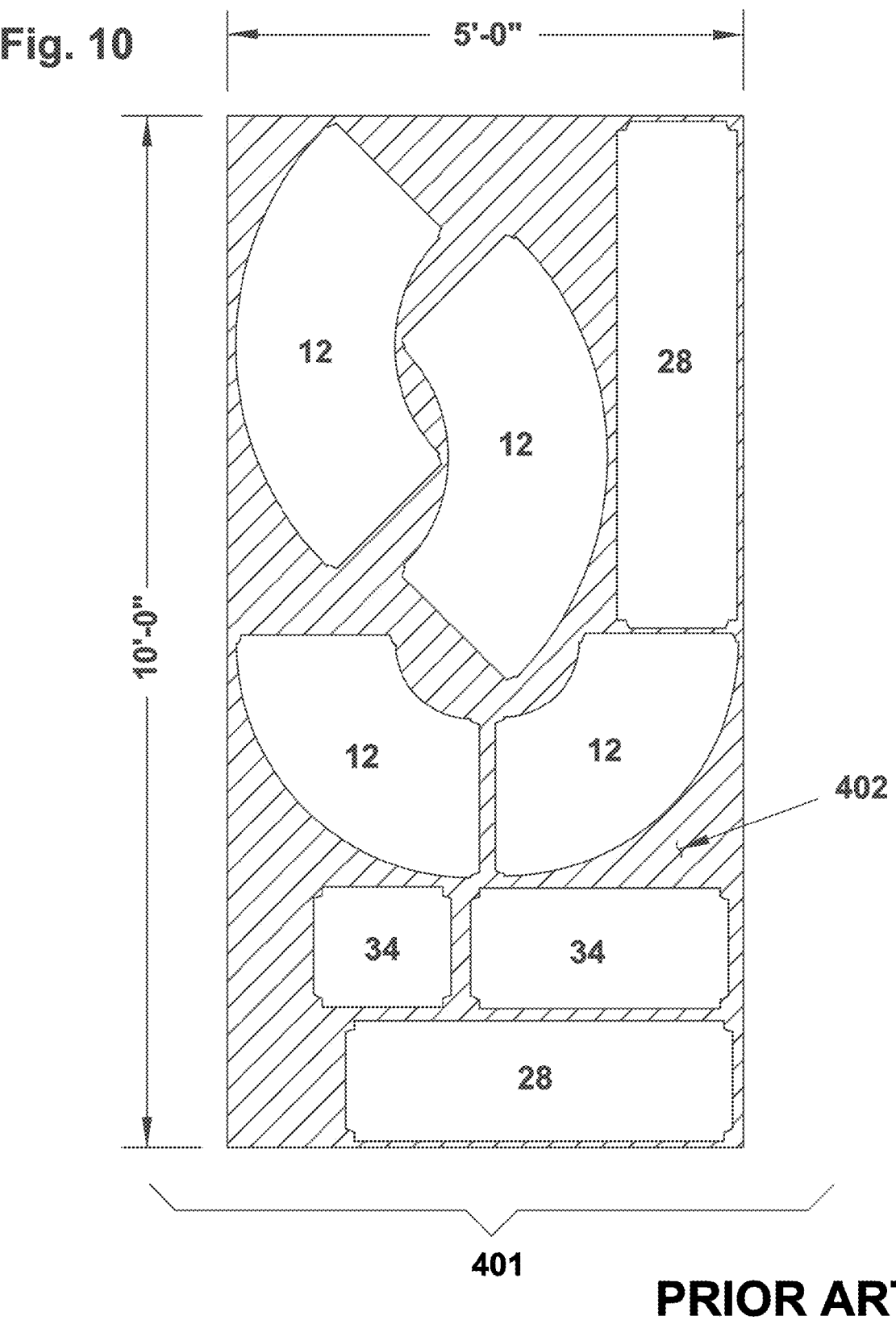
FIG. 10 is a view of a prior art computer optimized blank layout for small fittings using a nesting program for plasma cutting of prior art radius elbows.

FIG. 10 illustrates a typical computer-optimized layout of a sheet metal blank 401 of prior art radius elbow faces 12, heels 28, and throats 34 ready for plasma cutting. The term blank as used here represents a flat piece of sheet metal. From the blank 401 illustrated, one complete traditional radius elbow 10 and one complete short radius elbow 210 may be fabricated. The shaded portion of FIG. 10 illustrates the amount of waste material 402 present even in optimized cutting layouts with the prior art radius elbows.

Figure 11:
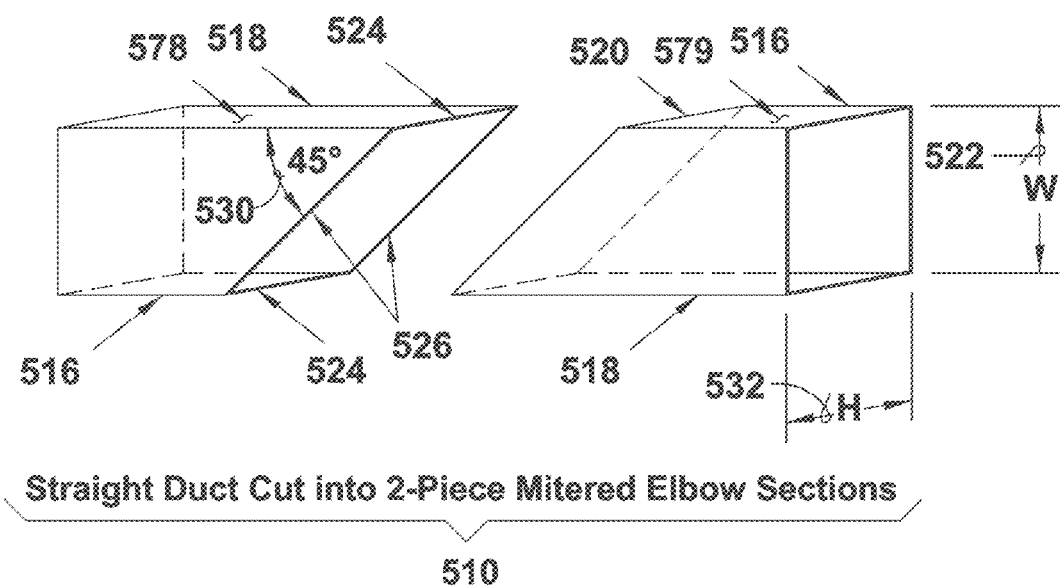
FIG. 11 illustrates one process of cutting a Scrapless Fabrication Duct Manufacturing elbow.

FIG. 11 illustrates one of the alternative methods of cutting material to make a Scrapless Fabrication duct elbow 510 as described in U.S. patent application Ser. No. 11/688,544, As shown in FIG. 11, to form a 90-degree elbow, a finished straight joint 20 (FIG. 4) is cut on two opposing sides at a 45-degree angle 530, and the other two opposing sides are cut straight across, forming a continuous cut 520. Each resulting tube 578 and 579 has two angled-cut edges 526 and two straight-cut edges 524. Each tube 578 and 579 then has two shorter bents (or seams) 516 and two bents (or seams) 518. The resulting tubes 578 and 579 have a rectilinear flow area equal to width 522 by span 532.

Figure 12:
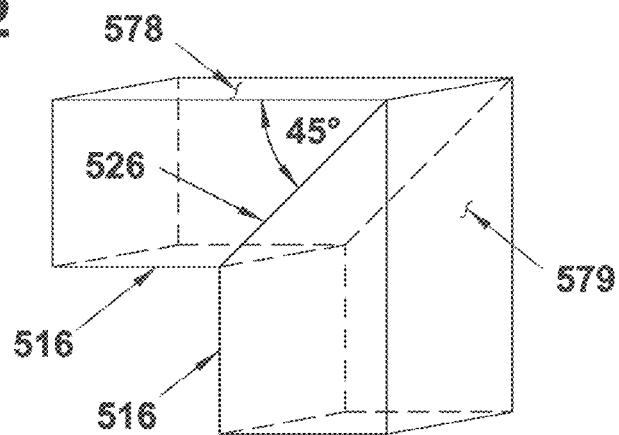
FIG. 12 illustrates an assembled Scrapless Fabrication Duct Manufacturing elbow.

As shown in FIG. 12, in Scrapless Fabrication, one of the two resulting tubes 578 or 579 is simply rotated and the 45-degree cut edges 526 are joined as shown in FIG. 12, with the four short bents (or seams) 516 on the same side, forming a finished elbow 510. Elbows of different angles are constructed by varying the angle of the cut. Further information on Scrapless Fabrication is available in patent application Ser. No. 11/688,544, which is incorporated by reference herein in its entirety.

Figure 13:
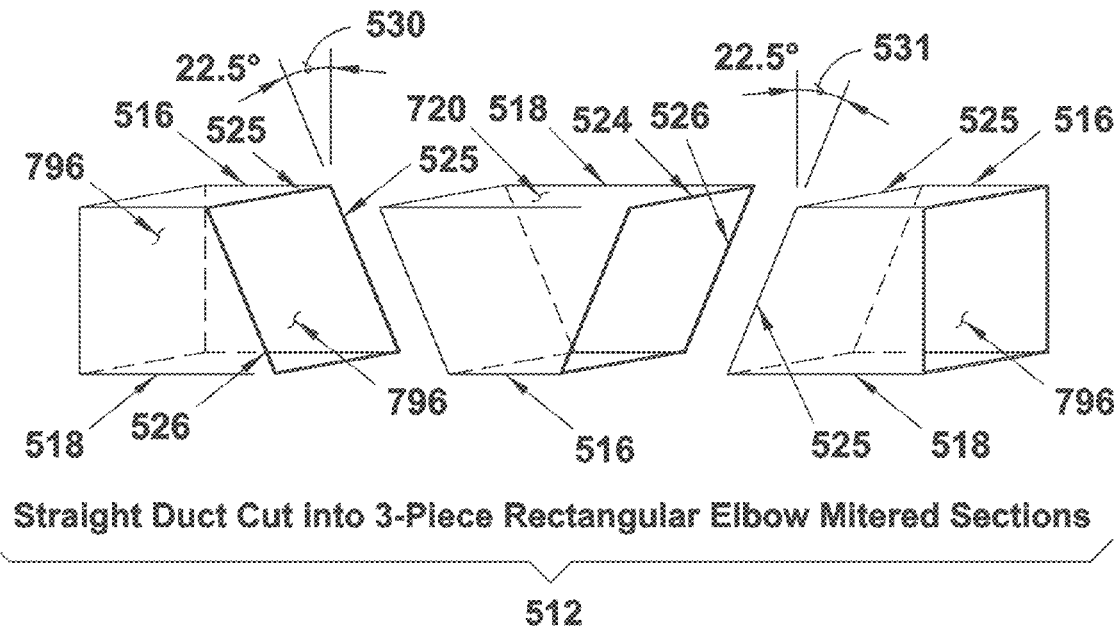
FIG. 13 illustrates a method of cutting an alternative Scrapless Fabrication Duct Manufacturing elbow.

FIG. 13 illustrates a method of constructing an alternative Scrapless Fabrication duct elbow 512, wherein a finished straight section of duct is cut on two first opposing sides at a 22½ degree angle 531, and the other two second opposing sides are cut straight across, forming a continuous cut 525. A second continuous cut 525 is made some arbitrary distance from the first cut, cutting the first two opposing sides at an opposite 22½ degree angle 530 and the second two opposing sides straight across. Each resulting tube 720 or tube 796 has two shorter bents (or seams) 516 and two longer bents (or seams) 518. All the angled edges 526 are the same length. The center tube 720 is then rotated 180-degrees and the cuts 525 are joined with all the shorter bents (or seams) 516 on the same side of the finished three-piece Scrapless elbow 512, as illustrated in FIG. 14.

Figure 14:
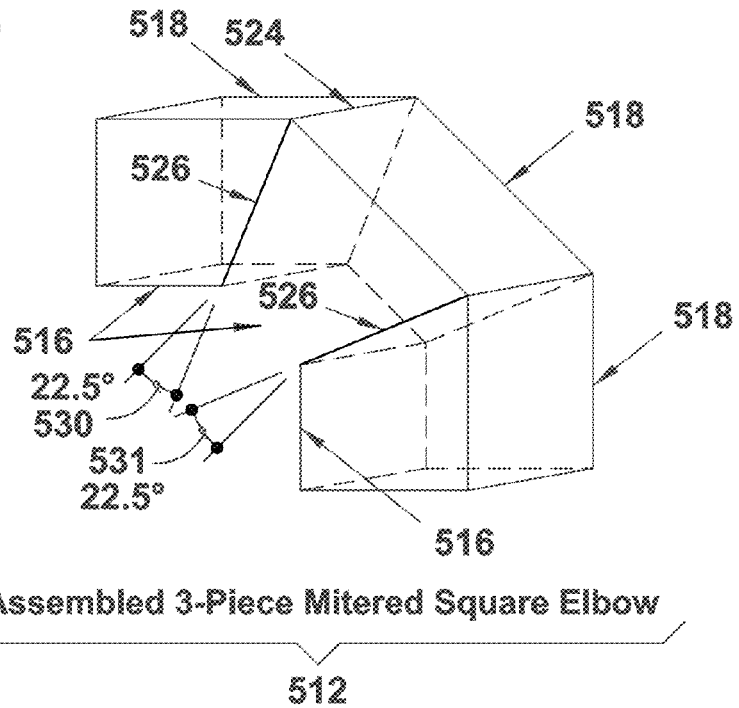
FIG. 14 illustrates the alternative Scrapless Fabrication Duct Manufacturing elbow assembled.

FIG. 14 illustrates the assembled Scrapless Fabrication elbow 512. The shorter bents 516 are on the same side of the finished piece, with the longer bents 518 on the opposite side, joining the angled edges 526 and the straight edges 524 as shown. The cumulative effect of the four 215 degree angles results in a 90-degree change in direction.

Figure 15:
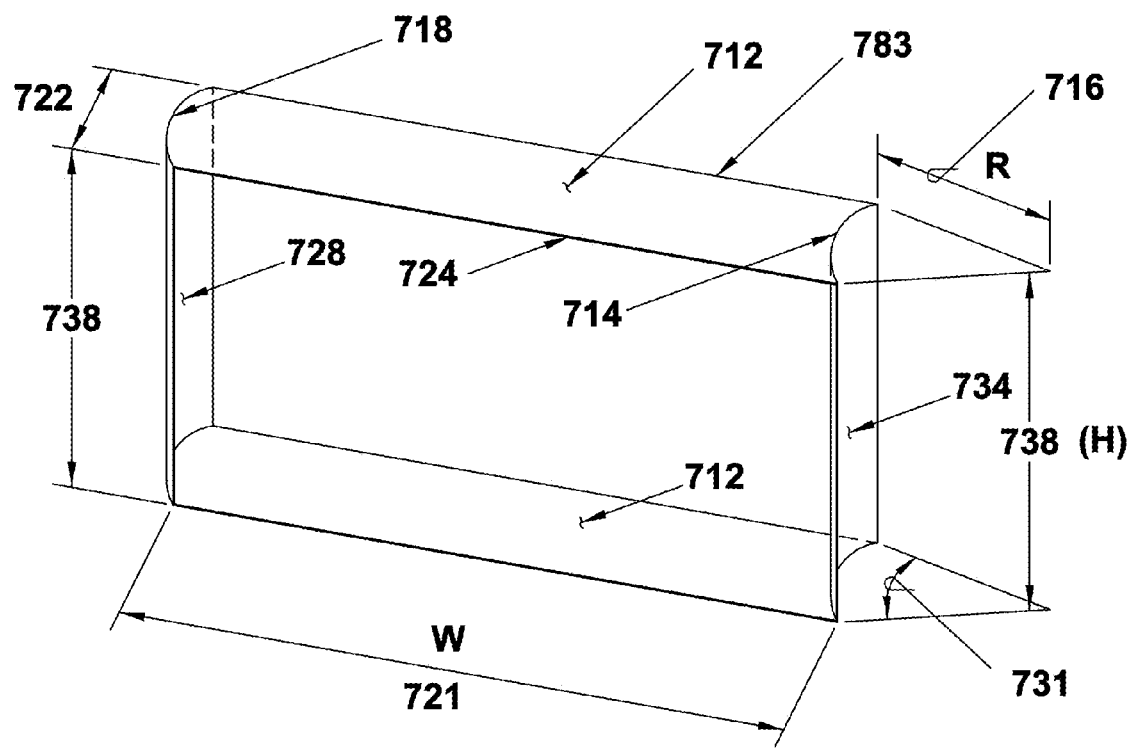
FIG. 15 illustrates a typical Lean Duct Connector.

FIG. 15 illustrates a Lean Duct Connector 708. The Lean Duct Connector 708 is formed from two identical Connector faces 712, a heel 728 and a throat 734. Each Connector face 712 has one inside boundary 714 that forms an arc of a circle with a radius 716, and an outside boundary 718 that forms an identical arc of the same radius 716. The radius 716 and the angle 731 subtended by boundaries 714 and 718 may vary.

The finished width 721 (W) of the Connector 708 is equal to the finished dimension of angled edge 526 on the Scrapless Fabrication duct tubes 578 and 579 or 720 and 796. The finished span 738 is equal to the span 532 of duct tubes 578 and 579 or to the span of the duct to which the Connector will be joined.

Parallel to the curved inside boundary 714 and curved outside boundary 718 of each Connector face 712 may be seam allowances (not shown) of approximately inch to 1½ inches, the exact size varying with the seaming method employed. The seam allowances are cut in continuous arcs parallel to inside boundary 714 and outside boundary 718.

Along each straight edge 724 of Connector face 712 is a seam allowance 783, approximately ¼ inch to 1½ inches wide depending on the seaming method chosen.

The heel 728 and throat 734 of the Connector 708 are formed from two identical sheet metal sections. The finished chord length 722 of heel 728 and throat 734 is equal to the finished length 722 of the Connector face 712. The heel and throat may have seam allowances on all four sides (not shown).

Figure 16:
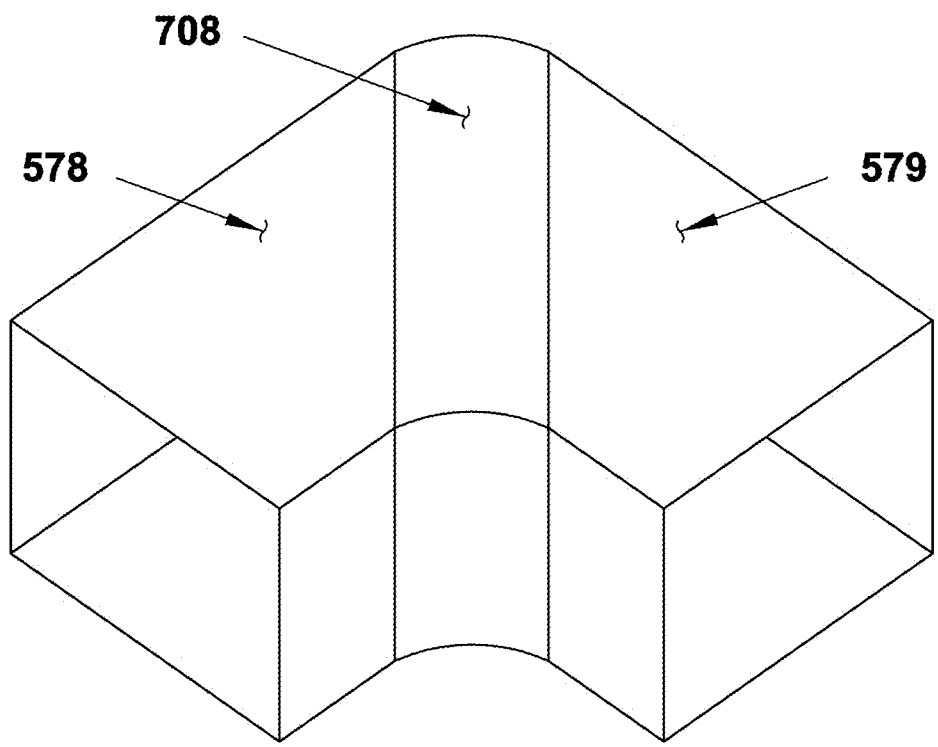
FIG. 16 is a first embodiment of an elbow utilizing the Lean Duct Connector.

FIG. 16 illustrates the assembly of a Lean Duct elbow 710. The Lean Duct Elbow 710 has two end tubes 578 and 579, formed from a standard duct joint (such as joint 20 in FIG. 4) cut and rotated, using the Scrapless Fabrication method. Alternatively, the end tubes 578 and 579 may be formed directly from flat sheet metal stock. Between the two end tubes 578 and 579 is Lean Duct Connector 708, Connector 708 is joined to tubes 578 and 579 using seam allowances (allowances not shown) in any conventional joining method. The seaming method of joining the Connector to the two end tubes 578 and 579 is not necessarily the same method employed to construct or seam together the Connector itself.

Figure 17:
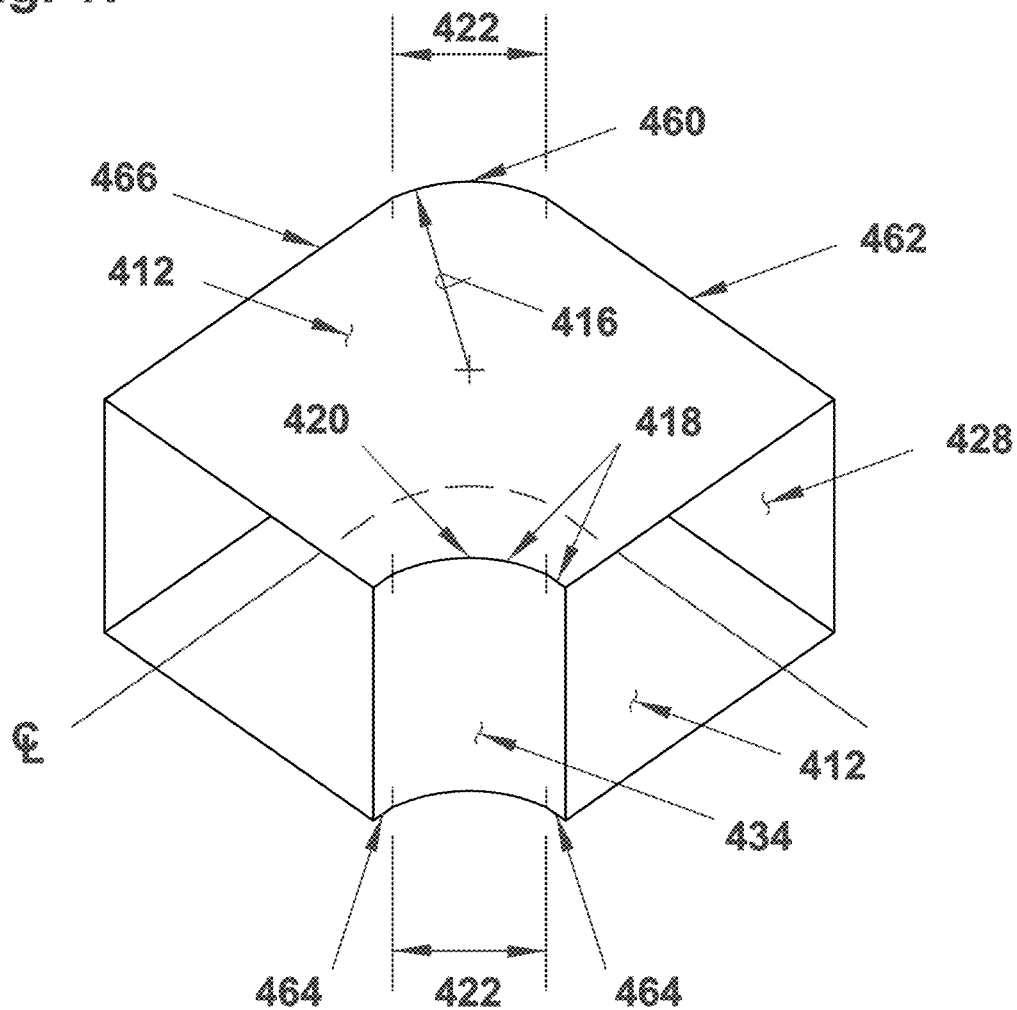
FIG. 17 illustrates a specially fabricated segmented elbow.

FIG. 17 illustrates a segmented elbow 410 specially fabricated to mimic the shape of the Lean Duct elbow 710 (FIG. 16), but without any internal crosswise seams. The side faces 412 were cut so that the inside boundary 418 and outside boundary 466 are shaped to mimic the shape of a Lean Duct Elbow 710 (FIG. 6). The outside boundary 466 has a curved portion 460 inside two straight portions 462 on either side. Similarly, the inside boundary 418 has a curved portion 420 inside two straight portions 464. The curved portions 420 and 460 have a radius 416. The heel 428 is a rectangular piece of sheet metal, equal in length to the two straight portions 462 plus the curved portion 460 of the outside boundary 466. When the heel 428 is attached to the side faces 412, it will automatically conform in shape to match the shape of the outside boundary 466. Similarly, the throat 434 is a rectangular piece of sheet metal, equal in length to the two straight portions 464 plus curved portion 420 and automatically conforms to the shape of the boundary 418 when joined in the finished elbow 410. A line connecting the centers of the arcs forming both curved portions will run parallel to the flow of air through the fitting.

Figure 18:
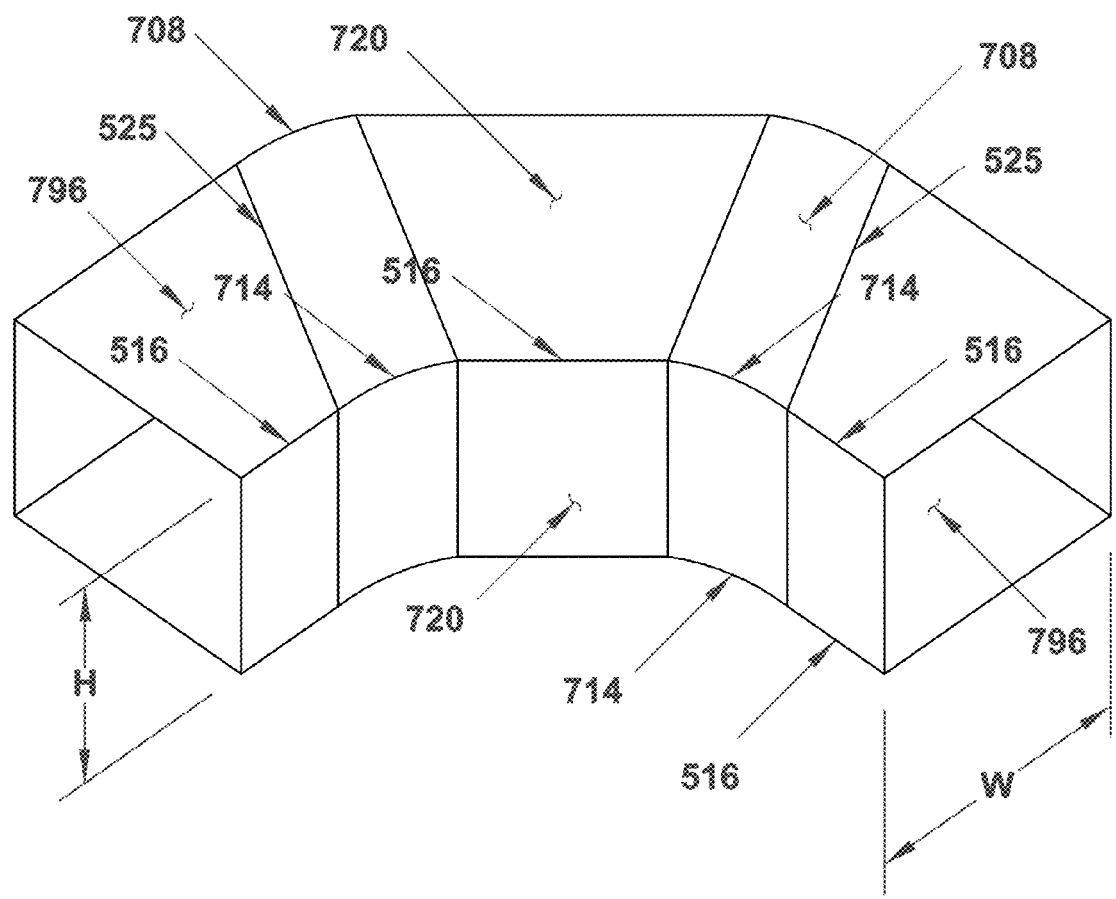
FIG. 18 illustrates a second embodiment of an elbow utilizing the Lean Duct Connectors.

FIG. 18 illustrates an alternative embodiment of a Lean Duct elbow 715. Elbow 715 comprises two end tubes 796, a center tube 720, and two Connectors 708. The tubes 720 and 796 are cut from a rectangular duct joint 20 (FIG. 4), using two opposite 22½ degree angled cuts 525, as illustrated in FIG. 13. The center tube 720 is rotated so that all shorter bents (or seams) 516 are on the same side of the finished elbow 715 as are the inside boundaries 714 of the connectors 708, resulting in a finished 90-degree elbow 715.

Figure 19:
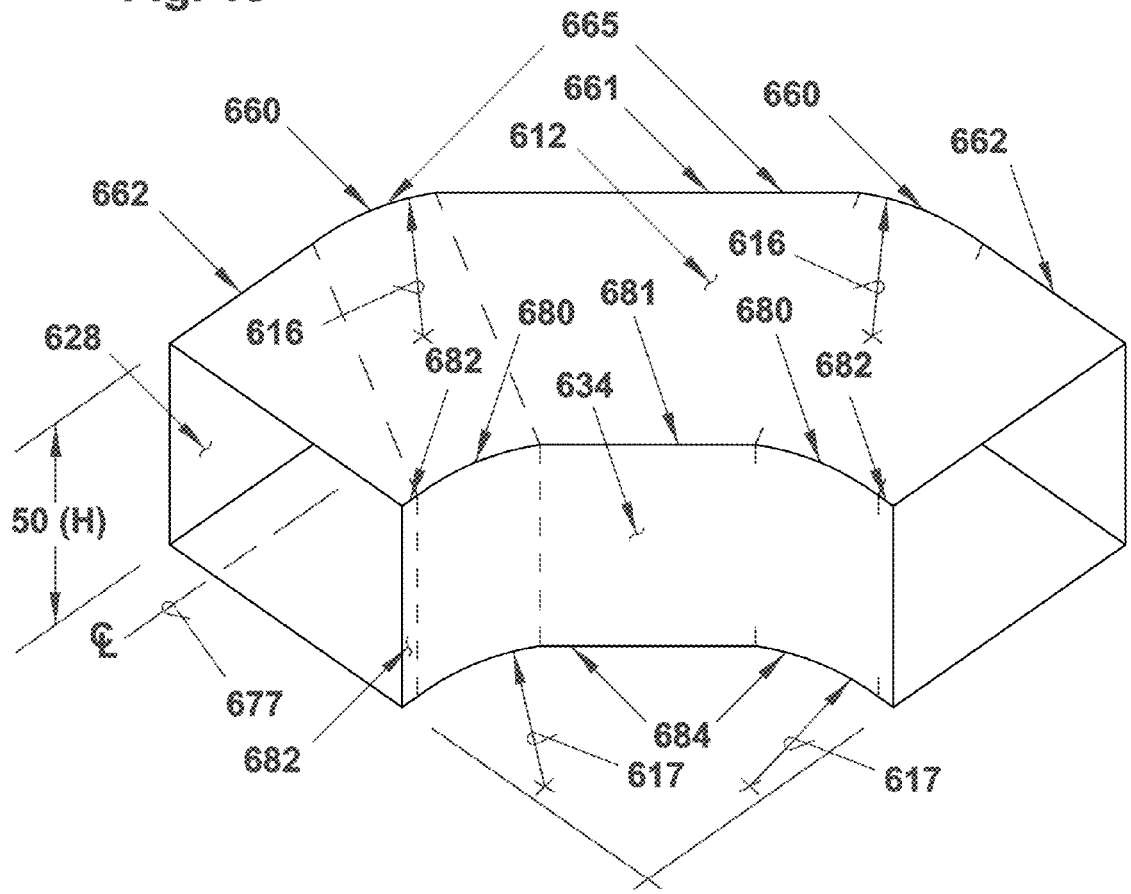
FIG. 19 illustrates a second specially fabricated segmented elbow.

FIG. 19 illustrates a segmented elbow 610, specially fabricated to mimic the shape of the Lean Duct elbow 715 (FIG. 18) but without any internal crosswise seams. The side faces 612 are cut so that the outside boundary 665 has two curved portions 660, a center straight portion 661, and two end straight portions 662. The curved portions 660 have identical radii 616.

The inside boundary 684 of face 612 is similarly cut with two curved portions 680, two outer straight portions 682, and one center straight portion 681 as shown. The portions 680, 681, and 682 are aligned with portions 661, 660, and 662 as though actual connectors 708 (FIG. 15) were installed. The inside curved portions 680 have the radius 617, which is the same length as the radius 616 of the outside curved portions 660. The alignment is illustrated by the dotted lines on FIG. 19.

The heel 628 is built from a rectangular piece of sheet metal, cut in this instance to match the span 50 of the joint 20 (FIG. 4) to which it will be connected and the total length of the outside boundary 665. The throat 634 is formed in a similar manner. Both the throat 634 and heel 628 will automatically conform to the shape of the inside boundary 684 and outside boundary 665, respectively, when the finished elbow 610 is assembled.

The overall length of elbow 610 is such that when the segmented elbow 610 is assembled, the centerline flow path 677 equals the centerline flow radius 76 of either the traditional radius elbow 10 (FIG. 2) or the short radius elbow 210 (FIG. 6).

Figure 20:
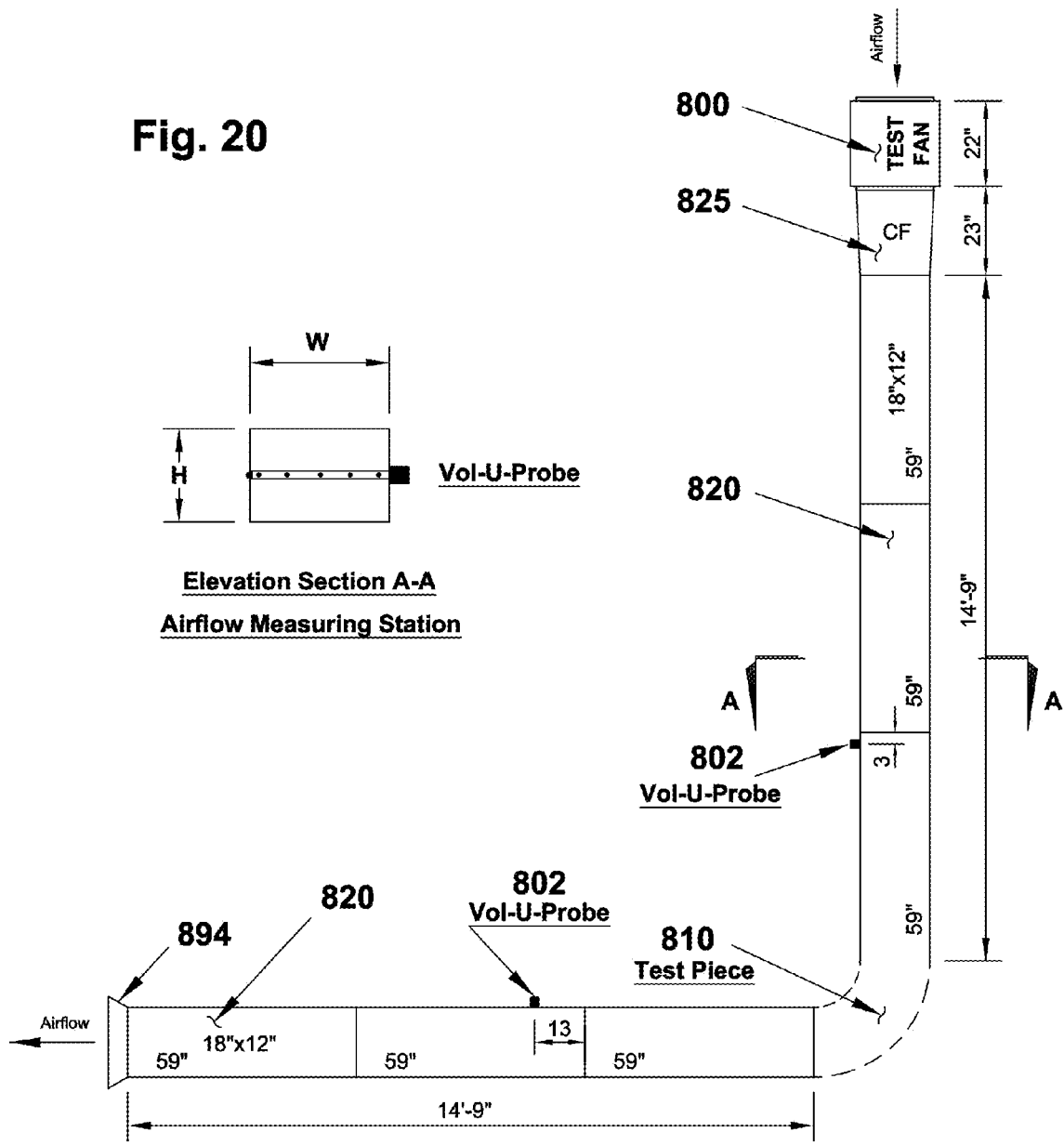
FIG. 20 illustrates the pressure test setup for the supply fitting tests.
Figure 21:
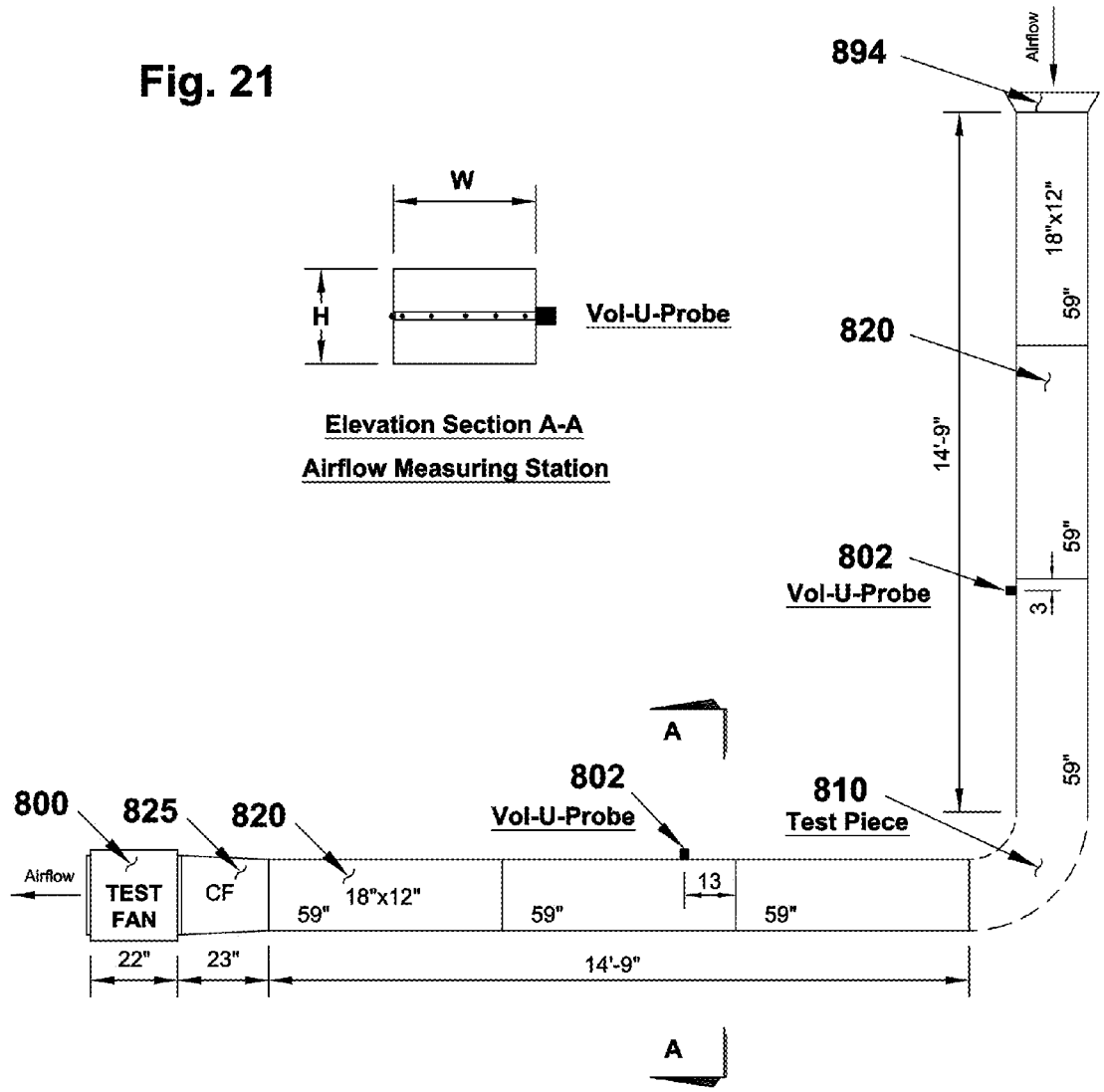
FIG. 21 illustrates the pressure test setup for the exhaust fitting tests.
Figure 22:
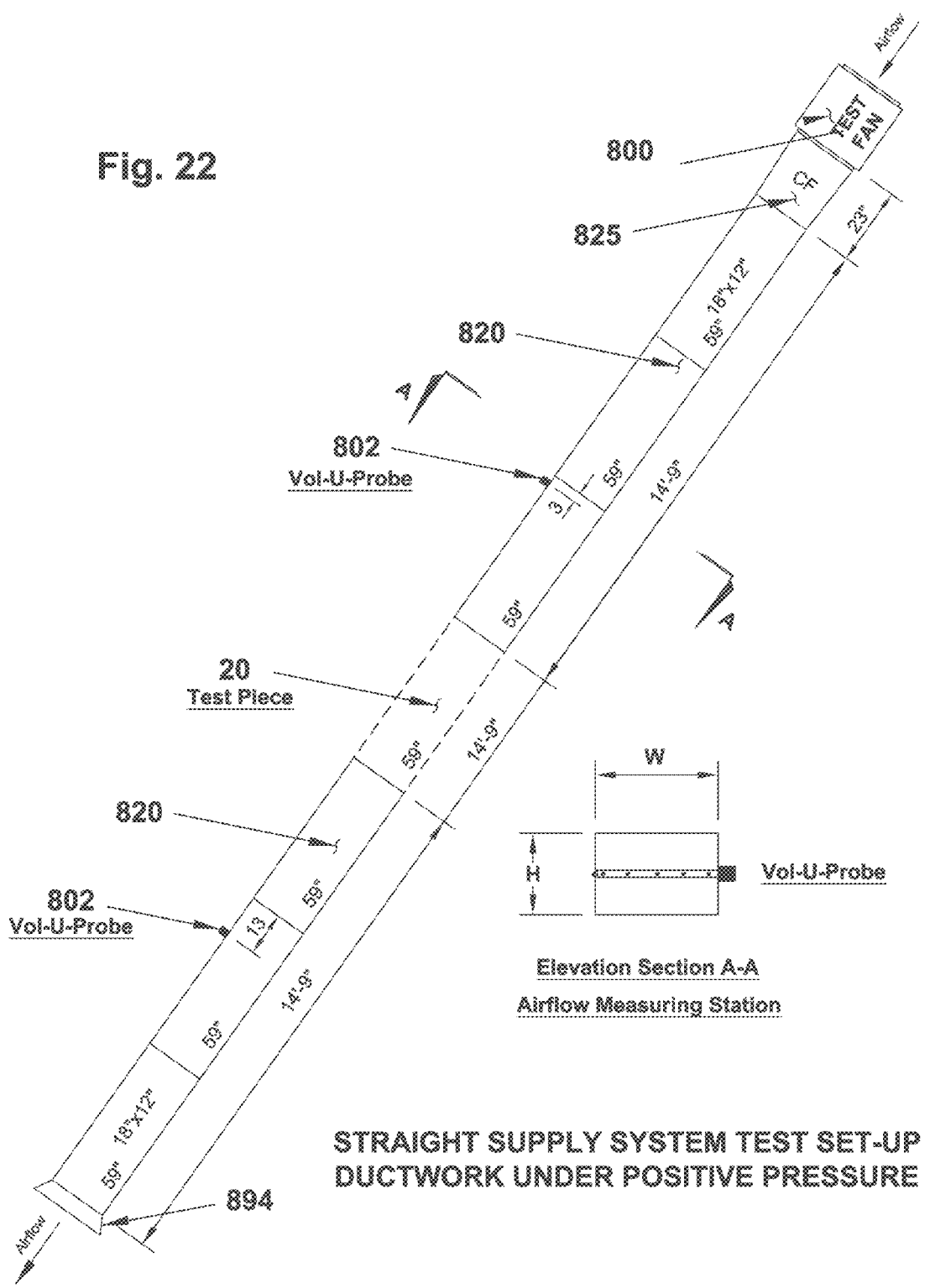
FIG. 22 illustrates the pressure test setup for the control supply test.

FIGS. 20, 21, and 22 illustrate the test setups used to the test the pressure drop through various elbow configurations under supply and exhaust conditions. FIG. 20 represents the supply air test wherein Fan 800 was connected via fan fitting 825 to blow into a straight length of rectangular duct 820 14'-9" feet long. The test elbow 810, illustrated in broken lines, was connected to the straight run of duct 820, and then connected to a second straight run of duct 820, also 14'-9" long. One VOLU-probe/VS Air Traverse Stations air monitor 802 was placed between the fan fitting 825 and the elbow 810, at a distance of 121 inches from the fan fitting 825. A second Volu-Probe/VS 802 was placed between the elbow 810 and open end 894, 72 inches downstream of the test elbow 810. The VOLU-probes used are rated as 0.53% accurate at 4,000 FPM air velocity.

FIG. 21 represents the exhaust air test wherein Fan 800 was connected to exhaust air via, a fan fitting 825 from a straight length of rectangular duct 820 14'-9" feet long. The test elbow 810, illustrated in broken lines, was connected to the straight run of duct 820, and then connected to a second straight run of duct 820, also 14'-9" long. VOLU-probe/VS Air Traverse Stations air monitors 802 were placed 105 inches upstream from fan fitting 825 and 56" upstream from the test elbow 810.

FIG. 22 illustrates a second test setup used to test the pressure drop and air flow of a straight run of duct, using the same fan 800 and the same VOLU-probes 802. A straight joint 20, 59" long, was inserted between two ducts 820. This setup was used to test the pressure drop and air flow provided by the fan in straight duct with no bends or obstructions. One VOLU-probe 802 is 72 inches downstream from the joint 20. A second. VOLU-probe 802 is 121 inches downstream from the fan fitting 825. A similar test setup (not illustrated) was used to test the pressure drop in a straight joint 20 under exhaust conditions.

Figure 23A:
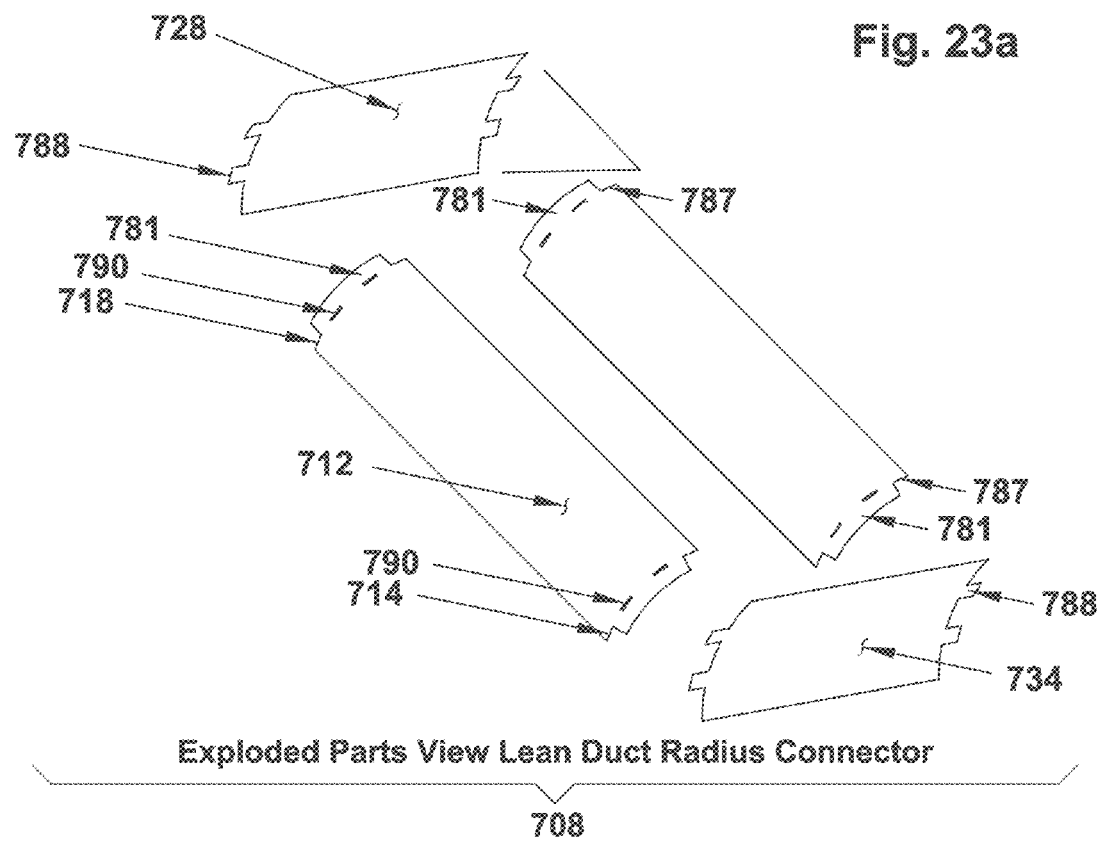
FIG. 23a illustrates an exploded view of a Lean Duct Connector utilizing an alternative seaming method.

FIG. 23*a* is an exploded view illustrating an alternative seaming method for constructing the radius Connector 708. In lieu of seam allowances on heel 7 28 and throat. 734, tabs 788 are formed. Tabs 788 can be approximately one inch long and one inch wide, but may vary in length and width to suit the desire of the fabricator. Tabs 788 are spaced such that at least two tabs each are on each end of the heel 728 and throat 734.

Each Connector face 712 has mating slots 790 cut into the body of the face 712 adjacent to the intersections of the face 712 and its seam allowances 781. These slots 790 are the same width and spacing as tabs 788 with a depth equal to the thickness of the material used.

To form the Lean Duct Connector 708, the heel 728 and throat 734 are bent into an arc to match the arc of boundaries 714 and 718. The tabs 788 are inserted into slots 790 and bent over to secure the faces 712 to the heel 728 and throat 734. Then the seam allowance 781 is bent in the opposite direction to seal the duct. Seam allowances 781 may have a notch 787 cut to facilitate bending.

Figure 23B:
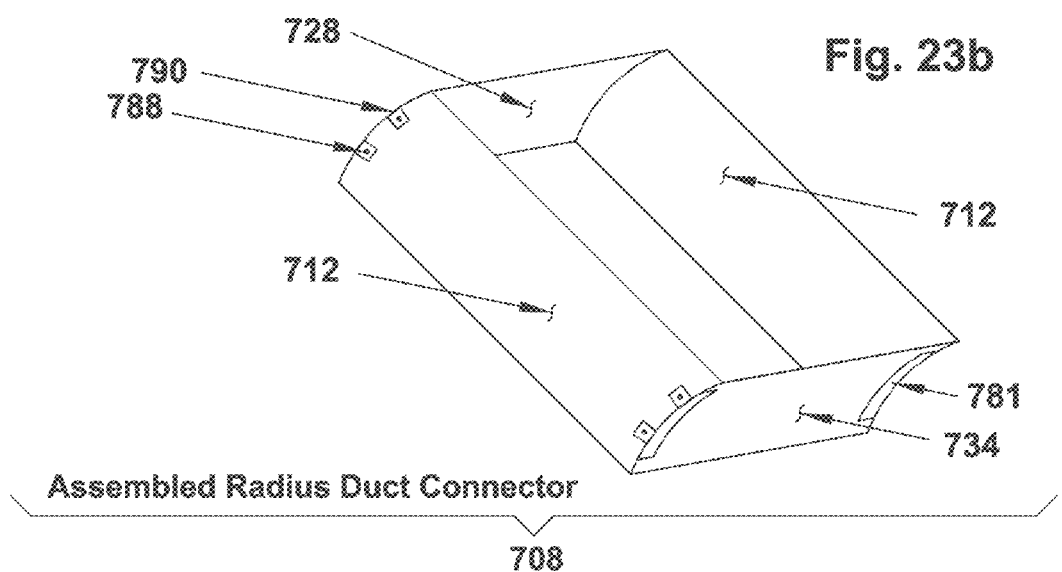
FIG. 23b illustrates the same Lean Duct Connector assembled, utilizing the alternative seaming method.

FIG. 23*b* illustrates the assembled Lean Duct Connector 708. Tabs 788 have been inserted through slots 790 and folded over onto faces 712. Seam allowance 781 has been folded over onto heel 728 and throat 734. Both the tabs 788 and seam allowance 781 are on the outside of the Connector 708, resulting in a smooth surface inside the Connector 708. The tab-slot joining method prevents the Connector 708 from twisting or separating and can be performed by unskilled workers, reducing the cost of labor. Inserting the tabs 788 into the matching slots 790 and bending the tabs 788 over automatically aligns the heels 728 and throats 734 with the faces 712, keeping the duct elbow 715 (FIG. 18) or 710 (FIG. 16) straight and firm.

Figure 24:
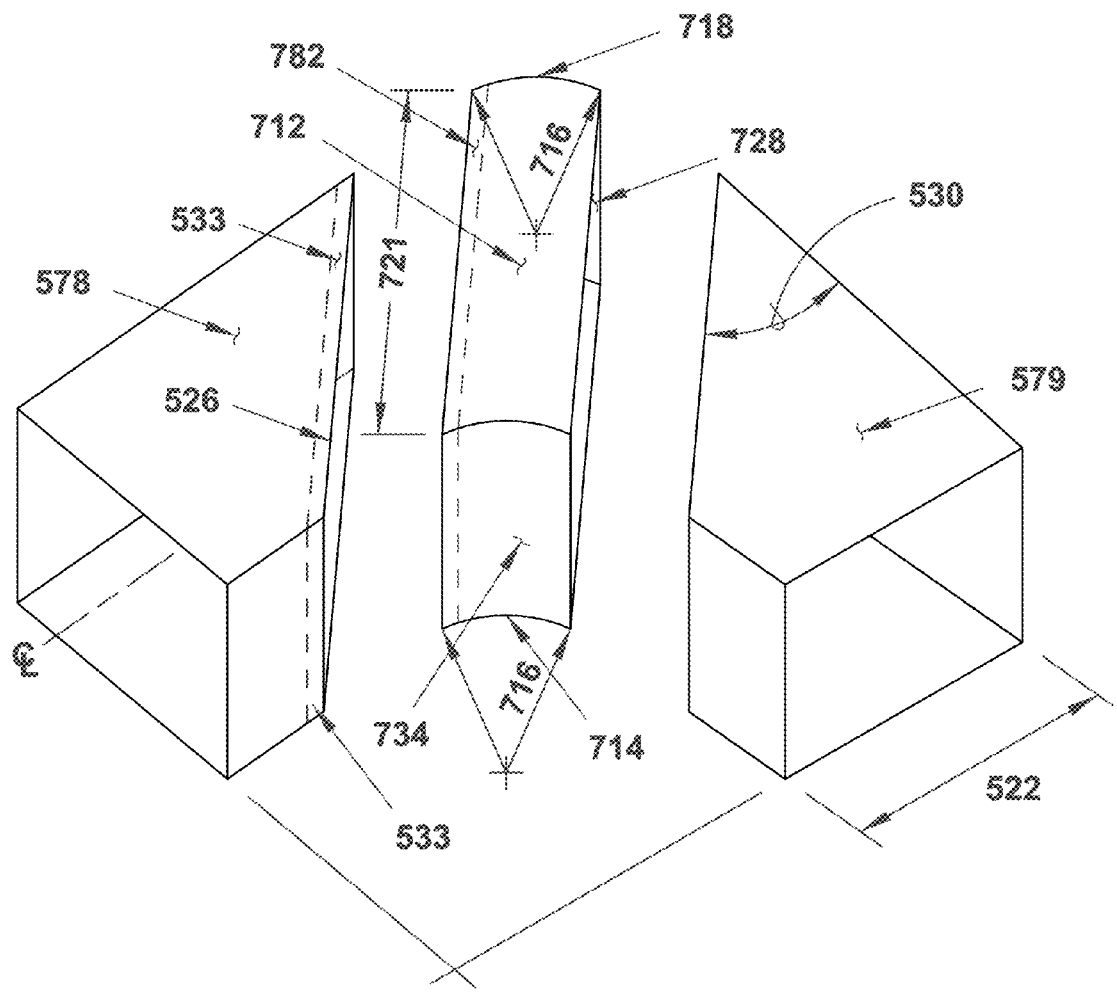
FIG. 24 illustrates an alternative joining method for the Streamlined Radius Connector to a straight section of duct.

FIG. 24 illustrates an alternative seam allowance on the Connector face 712. Seam allowance 782 is cut at each end in a straight line at an angle perpendicular to the radii 716 of the inside and outside boundaries 714 and 718. This method allows the seam allowance 782 to match the seam allowance 533 on the angled edge 526 on the mitered straight duct tube 578 or 579. It also allows the finished seam (not illustrated) between the heel 728 and the mitered duct tubes 578 and 579 to lie flat. Similarly, the finished seam between the throat 734 and the mitered duct tubes 578 and 579 can lie flat. The finished width 721 of the radius Connector equals the finished width 522 of duct tubes 578 and 579 times the arccosine of angle 530.

Figure 25:
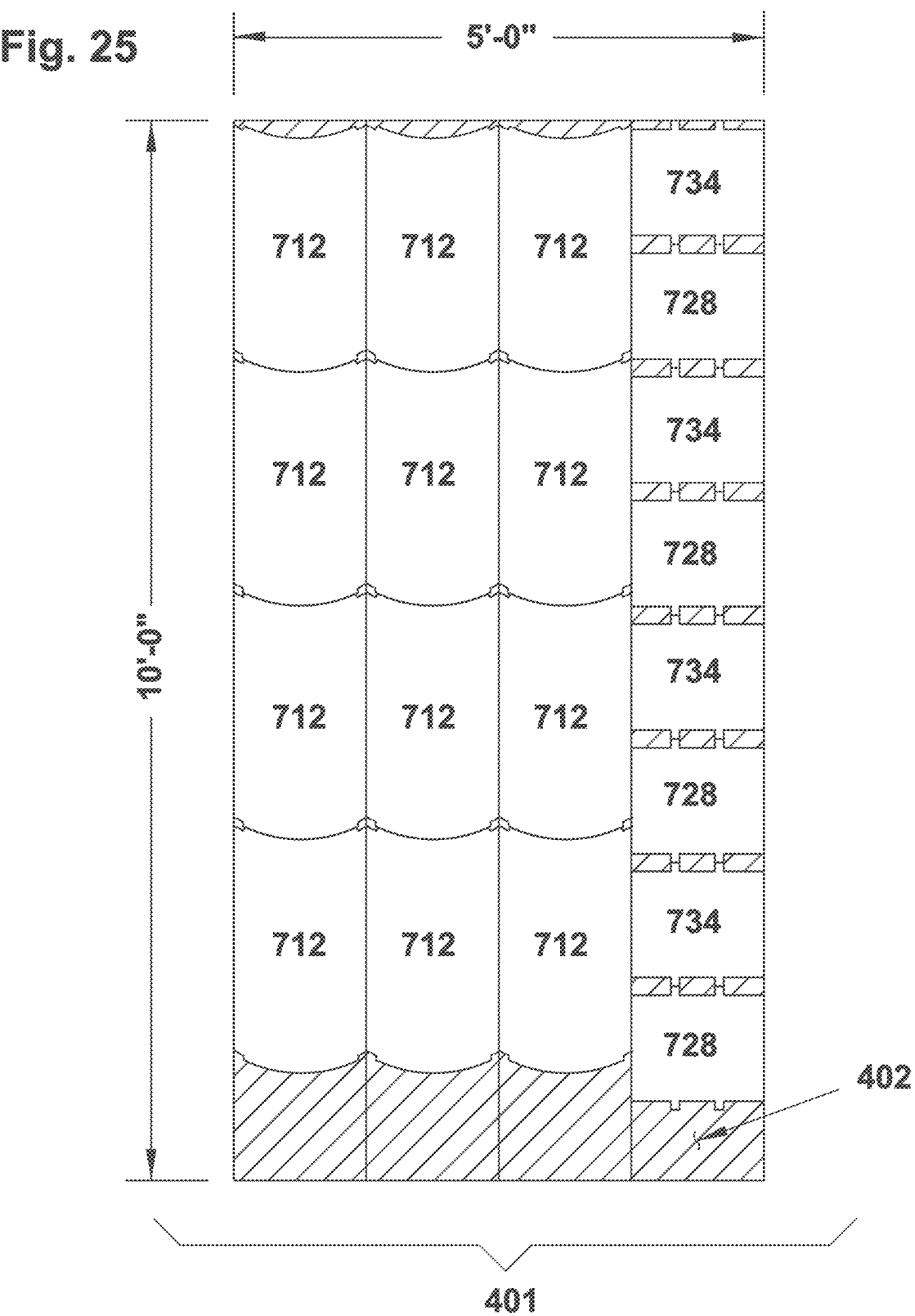
FIG. 25 illustrates a computer optimized blank layout for the Lean Duct Connectors.

FIG. 25 illustrates a computerized cutting layout of Lean Duct Connector Faces 712, Lean Duct heels 728, and Lean Duct throats 734. FIG. 25 illustrates the reduced waste material 402 produced using the Lean Duct Manufacturing system.

Figure 26:
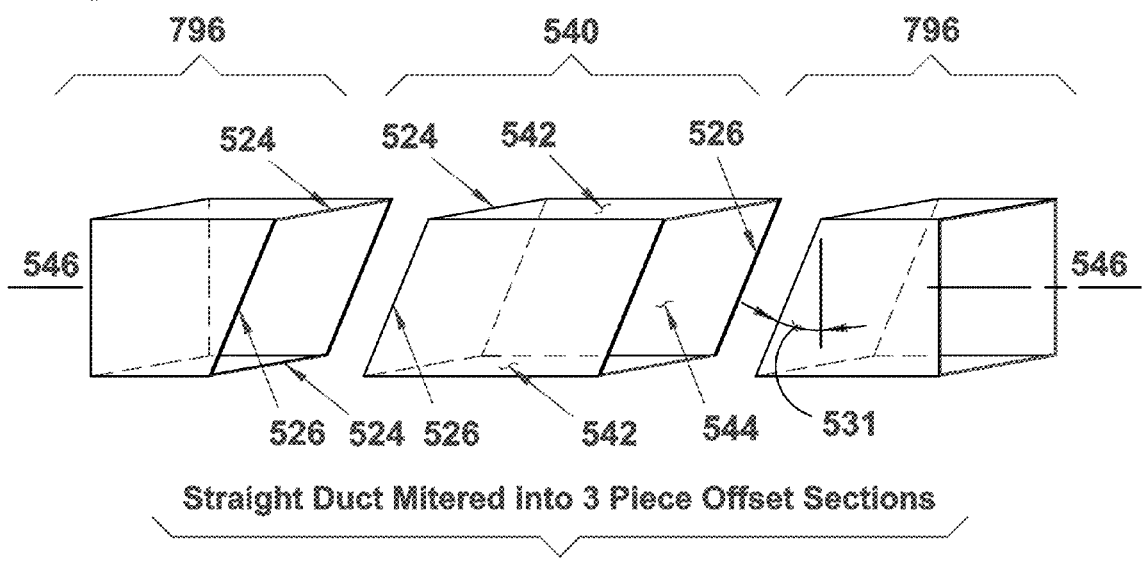
FIG. 26 illustrates the first step in constructing an alternative duct offset fitting using Lean Duct Connectors.

FIG. 26 illustrates the first step in one method of constructing an alternative duct fitting using Lean Duct Connectors 708 (FIG. 15). FIG. 26 illustrates cutting a straight duct joint 10 into three sections. In FIG. 26, a first tube 796 is cut, similar to that shown in FIG. 13, so that two opposing edges 524 are cut perpendicular to the centerline axis 546 of the joint 10 and two opposing sides 526 are cut at a 22.5-degree angle 531 to a line perpendicular to the centerline axis 546 of the joint 10. A second tube 796 is cut from the joint with all edges 524 and 526 aligned with and parallel to the edges 524 and 526 of the first tube 796. This results in a center tube 540 with four edges 524 parallel to each other and 90 degrees from the centerline axis 546 of the joint 10 and with four edges 526 parallel to each other and at 22.5 degrees from a line perpendicular to the centerline axis 546 of the joint 10. Center tube 540 has two identical rectangular fixes 542 and two parallelogram faces 544.

Figure 27:
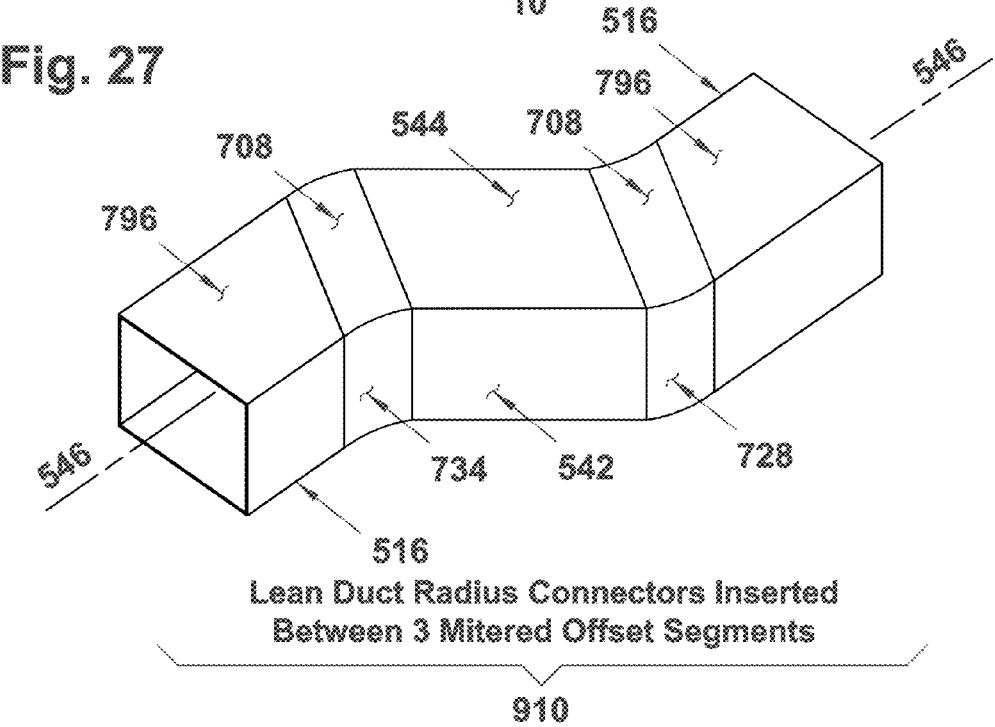
FIG. 27 illustrates an assembled Lean Duct Offset fitting.

FIG. 27 illustrates an assembled Lean Duct Offset 910. In this embodiment, first tube 796 is joined to a Lean Duct Connector 708 with the shorter seams or bents 516 of the first tube 796 on the same side of the fitting as the first throat 734. The first Lean Duct Connector 708 is in turn connected to a first end of a center tube 540 that has been rotated 180 degrees around the axis 546 with respect to first tube 796. A second end of center tube 540 is connected to a second radius connector 708. The throat 734 of the second radius connector is on the opposite side of the assembled Lean Duct Offset 910 from the throat 734 of the first Lean Duct Connector 708. The second Lean Duct Connector 708 is in turn connected to a second tube 796 so that the throat 734 of the second Lean Duct Connector is on the same side of the assembled Lean Duct Offset 910 as the short bents 516 of the second tube 796. In this manner, the throat 734 of the second Lean Duct Connector and shorter bent 516 of the second tube 796 are on the opposite side of the fitting from the throat 734 of the first Lean Duct Connector 708 and shorter bent 516 of the first tube 796. This offset 910 allows the fluid to continue to flow in the same direction as it was originally flowing, but the duct run may be offset to avoid an obstruction. That is, the fluid enters parallel to centerline axis 546 of the first tube 796 and exits parallel to the centerline axis 546 of the second tube 796 while both such axes 546 remain parallel to each other.

Other offsets may be constructed using various end tubes and center tubes. Many other fittings not described here can be constructed utilizing Lean Duct Connectors To test the efficacy of Lean Duct Manufacturing, various elbow configurations were constructed and tested for pressure loss at several air velocities using the Volu-Probes 802 as shown in FIGS. 20 and 21. All the tests were conducted on duct sections with inside rectangular flow areas of 18-inches wide×12-inches high (span measurement). The results are summarized in Tables 1-6 below.

Since the performance of the traditional radius elbow 10 differs markedly from that of the short radius elbow 210, several elbows 710 were constructed with different inside radii 716 to determine if the inside radii 716 had an effect on the connectors 708 performance.

The test static pressure loss (ΔSP) in Tables 1-6 represents the difference in static pressure readings between the two Volu-Probes 802 illustrated in FIGS. 20, 21, and 22.

Because the Volu-Probes were always 72 inches plus 56 inches, or a total of 128 inches, from the ends of the elbows, while the lengths of the flow paths through the elbows varied, the Test Static Pressure Losses represent readings from different overall lengths of duct. Therefore, it is necessary to add or subtract the equivalent loss from a straight length of duct to the raw data to normalize the test results.

First, a 59-inch length of straight duct joint 20 was inserted between the Volu-Probes 802 as shown in FIG. 22. This test measured the pressure loss through 187 inches of straight duct and provided a loss per linear inch of straight duct.

As shown in Table 1, at 1200-1400 fpm velocity supply air, the static pressure loss through a total 187" of straight duct was 0.0046 inches w.c., or 0.000025 inches w.c. per linear inch of straight duct.

Table 1 also shows that at 1200-1400 fpm velocity supply air, the static pressure loss through a standard radius elbow plus the 128 inches of straight duct between the Volu-Probes 802 was 0.0050 inches w.c.

Since the flow path through a standard radius elbow 10 is only 42.4 inches, to compare total losses it is necessary to add the loss that would be present in an additional 16.6 inches of straight duct (59 inches minus 42.4 inches) to get a comparable loss through 187 inches of duct run. 16.6 inches of straight duct would cause a static pressure loss of 0.000025 inches w.c./inch of duct times 16.6 inches, or 0.0004 inches w.c. Thus, a total length of 187 inches of duct including the radius elbow would experience a total static pressure loss of 0.005 inches w.c. (the raw test pressure loss) plus 0.0004 inches w.c. (the calculated normalization), or 0.0054 inches w.c.

Similarly, when the centerline length of the test elbow exceeded 59 inches, a normalized pressure loss was calculated by subtracting the loss in a straight run of duct.

Tables 1-6 below show both the raw test results and the normalized static pressure loss.

TABLE 1

1,200-1,400 FPM Velocity, Supply Duct Test

| FIG. | Description | Test Static Pressure Loss in inches w.c. | Length of Elbow in inches | Normalized Pressure Loss |
|---|---|---|---|---|
| 4 | Straight Duct 20 | 0.0046 | 59.00 | 0.0046 |
| 2 | Traditional - 1.5 W Radius Elbow 10 | 0.0050 | 42.40 | 0.0054 |
| 19 | 1.5 W Shape Smooth Test Elbow 610 (Segmented w/2 simulated curved Lean Connectors) | 0.0035 | 42.40 | 0.0039 |

TABLE 1-continued

1,200-1,400 FPM Velocity, Supply Duct Test

| FIG. | Description | Test Static Pressure Loss in inches w.c. | Length of Elbow in inches | Normalized Pressure Loss |
|---|---|---|---|---|
| 18 | 2-Conn. Lean Duct Elbow 715 | 0.0080 | 72.25 | 0.0077 |
| 6 | 1.0 W Short Radius Elbow 210 | 0.0180 | 28.26 | 0.0188 |
| 19 | 1.0 W Shape Smooth Test Elbow 610 (Segmented w/2 simulated curved Lean Connectors) | 0.0035 | 28.26 | 0.0043 |
| 18 | 2-Conn. Lean Duct Elbow 715 | 0.0080 | 72.25 | 0.0077 |
| 8 | Sq. Th. Elbow 110 - No Turn Vanes | 0.0790 | 30.00 | 0.0797 |
| 17 | (12 in long, 12 in radius Shape) Smooth Test Elbow 410 - No Vanes (Segmented w/1 simulated curved Lean connector) | 0.0025 | 27.26 | 0.0033 |
| 17 | (12 in long, 9 in radius Shape) Smooth Test Elbow 410 - No Vanes (Segmented w/1 simulated curved Lean connector) | 0.0050 | 27.26 | 0.0058 |
| 16 | 1-Conn. Lean Duct Elbow 710 12 in long, 10 in radius Connector | 0.0125 | 69.44 | 0.0122 |
| 16 | 1-Conn. Lean Duct Elbow 710 12 in long, 9 in radius Connector | 0.0150 | 69.44 | 0.0147 |
| 16 | 1-Conn. Lean Duct Elbow 710 12 in long, 12 in radius Connector | 0.0175 | 69.44 | 0.0172 |
| 8 | Sq. Th. Elbow 110 w/2" Single Vanes | 0.0125 | 30.00 | 0.0132 |
| 17 | (12 in long, 9 in radius Shape) Smooth Test Elbow 410 w/Vanes (Segmented w/1 simulated curved Lean connector) | 0.0075 | 27.26 | 0.0083 |
| 17 | (12 in long, 12 in radius Shape) Smooth Test Elbow 410 - w/Vanes (Segmented w/1 simulated curved Lean connector) | 0.0125 | 27.26 | 0.0133 |
| 16 | 1-Conn. Lean Duct Elbow 710 w/Vanes 12 in long, 10 in radius Connector | 0.0100 | 69.44 | 0.0097 |
| 16 | 1-Conn. Lean Duct Elbow 710 w/Vanes 12 in long, 9 in radius Connector | 0.0125 | 69.44 | 0.0122 |

TABLE 2

1,500-1,600 FPM Velocity, Supply Duct Test

| FIG. | Description | Test Static Pressure Loss in inches w.c. | Length of Elbow in inches | Normalized Pressure Loss |
|---|---|---|---|---|
| 4 | Straight Duct 20 | 0.0480 | 59.00 | 0.0480 |
| 2 | Traditional - 1.5 W Radius Elbow 10 | 0.0520 | 42.40 | 0.0563 |
| 19 | 1.5 W Shape Smooth Test Elbow 610 (Segmented w/2 simulated curved Lean Connectors) | 0.0570 | 42.40 | 0.0613 |
| 18 | 2-Conn. Lean Duct Elbow 715 | 0.0680 | 72.25 | 0.0646 |
| 6 | 1.0 W Short Radius Elbow 210 | 0.0610 | 28.26 | 0.0689 |
| 19 | 1.0 W Shape Smooth Test Elbow 610 (Segmented w/2 simulated curved Lean Connectors) | 0.0600 | 28.26 | 0.0679 |
| 18 | 2-Conn. Lean Duct Elbow 715 | 0.0680 | 72.25 | 0.0646 |
| 8 | Sq. Th. Elbow 110 - No Turn Vanes | 0.1850 | 30.00 | 0.1924 |
| 17 | (12 in long, 12 in radius Shape) Smooth Test Elbow 410 - No Vanes (Segmented w/1 simulated curved Lean connector) | 0.0780 | 27.26 | 0.0861 |
| 17 | (12 in long, 9 in radius Shape) Smooth Test Elbow 410 - No Vanes (Segmented w/1 simulated curved Lean connector) | 0.0830 | 27.26 | 0.0911 |
| 16 | 1-Conn. Lean Duct Elbow 710 9 in long, 8 in radius Connector | 0.0925 | 69.44 | 0.0898 |
| 16 | 1-Conn. Lean Duct Elbow 710 9 in long, 12 in radius Connector | 0.0925 | 69.44 | 0.0898 |
| 16 | 1-Conn. Lean Duct Elbow 710 9 in long, 6 in radius Connector | 0.0950 | 69.44 | 0.0923 |
| 8 | Sq. Th. Elbow 110, 2" Single Vanes | 0.0610 | 30.00 | 0.0684 |
| 17 | (12 in long, 9 in radius Shape) Smooth Test Elbow 410 w/Vanes (Segmented w/1 simulated curved Lean connector) | 0.0560 | 27.26 | 0.0641 |
| 17 | (12 in long, 12 in radius Shape) Smooth Test Elbow 410 - w/Vanes (Segmented w/1 simulated curved Lean connector) | 0.0560 | 27.26 | 0.0641 |
| 16 | 1-Conn. Lean Duct Elbow 710 w/Vanes 9 in long, 6 in radius Connector | 0.0580 | 69.44 | 0.0553 |
| 16 | 1-Conn. Lean Duct Elbow 710 w/Vanes 9 in long, 8 in radius Connector | 0.0600 | 69.44 | 0.0573 |
| 16 | 1-Conn. Lean Duct Elbow 710 w/Vanes 9 in long, 12 in radius Connector | 0.0625 | 69.44 | 0.0598 |

TABLE 3

2,100-2,300 FPM Velocity, Supply Duct Test

| FIG. | Description | Test Static Pressure Loss in inches w.c. | Length of Elbow in inches | Normalized Pressure Loss |
|---|---|---|---|---|
| 4 | Straight Duct 20 | 0.0850 | 59.00 | 0.0850 |
| 2 | Traditional - 1.5 W Radius Elbow 10 | 0.1000 | 42.40 | 0.1075 |
| 19 | 1.5 W Shape Smooth Test Elbow 610 (Segmented w/2 simulated curved Lean Connectors) | 0.1000 | 42.40 | 0.1075 |
| 18 | 2-Conn. Lean Duct Elbow 715 | 0.1250 | 72.25 | 0.1190 |
| 6 | 1.0 W Short Radius Elbow 210 | 0.1130 | 28.26 | 0.1270 |
| 19 | 1.0 W Shape Smooth Test Elbow 610 (Segmented w/2 simulated curved Lean Connectors) | 0.1075 | 28.26 | 0.1215 |
| 18 | 2-Conn. Lean Duct Elbow 715 | 0.1250 | 72.25 | 0.1190 |
| 8 | Sq. Th. Elbow 110 - No Turn Vanes | 0.3200 | 30.00 | 0.3332 |
| 17 | (12 in long, 12 in radius Shape) Smooth Test Elbow 410 - No Vanes (Segmented w/1 simulated curved Lean connector) | 0.1325 | 27.26 | 0.1469 |
| 17 | (12 in long, 9 in radius Shape) Smooth Test Elbow 410 - No Vanes (Segmented w/1 simulated curved Lean connector) | 0.1350 | 27.26 | 0.1494 |
| 16 | 1-Conn. Lean Duct Elbow 710 9 in long, 8 in radius Connector | 0.1550 | 66.44 | 0.1516 |
| 16 | 1-Conn. Lean Duct Elbow 710 9 in long, 12 in radius Connector | 0.1575 | 66.44 | 0.1541 |
| 16 | 1-Conn. Lean Elbow 710 9 in long, 6 in radius Connector | 0.1625 | 66.44 | 0.1591 |
| 8 | Sq. Th. Elbow 110, 2" Single Vanes | 0.1160 | 30.00 | 0.1292 |
| 17 | (12 in long, 9 in radius Shape) Smooth Test Elbow 410 w/Vanes (Segmented w/1 simulated curved Lean connector) | 0.0975 | 27.26 | 0.1119 |
| 17 | (12 in long, 12 in radius Shape) Smooth Test Elbow 410 - w/Vanes (Segmented w/1 simulated curved Lean connector) | 0.1000 | 27.26 | 0.1144 |
| 16 | 1-Conn. Lean Duct Elbow 710 w/Vanes 9 in long, 6 in radius Connector | 0.1100 | 66.44 | 0.1066 |
| 16 | 1-Conn. Lean Duct Elbow 710 w/Vanes 9 in long, 8 in radius Connector | 0.1100 | 66.44 | 0.1066 |
| 16 | 1-Conn. Lean Duct Elbow 710 w/Vanes 9 in long, 12 in radius Connector | 0.1200 | 66.44 | 0.1166 |

TABLE 4

1,200-1,400 FPM Velocity, Exhaust Duct Test

| FIG. | Description | Test Static Pressure Loss in inches w.c. | Length of Elbow in inches | Normalized Pressure Loss |
|---|---|---|---|---|
| 4 | Straight Duct 20 | (0.0270) | 59.00 | (0.0270) |
| 2 | Traditional - 1.5 W Radius Elbow 10 | (0.0475) | 42.40 | (0.0499) |
| 19 | 1.5 W Shape Smooth Test Elbow 610 (Segmented w/2 simulated curved Lean Connectors) | (0.0475) | 42.40 | (0.0499) |
| 18 | 2-Conn. Lean Duct Elbow 715 | (0.0540) | 72.25 | (0.0521) |
| 6 | 1.0 W Short Radius Elbow 210 | (0.0420) | 28.26 | (0.0464) |
| 19 | 1.0 W Shape Smooth Test Elbow 610 (Segmented w/2 simulated curved Lean Connectors) | (0.0500) | 28.26 | (0.0544) |
| 18 | 2-Conn. Lean Duct Elbow 715 | (0.0540) | 72.25 | (0.0521) |
| 8 | Traditional - Square Throat Elbow 110 - No Vanes | (0.1420) | 30.00 | (0.1462) |
| 17 | (12 in long, 12 in radius Shape) Smooth Test Elbow 410 - No Vanes (Segmented w/1 simulated curved Lean connector) | (0.0675) | 27.26 | (0.0721) |
| 17 | (12 in long, 9 in radius Shape) Smooth Test Elbow 410 - No Vanes (Segmented w/1 simulated curved Lean connector) | (0.0675) | 27.26 | (0.0721) |
| 17 | (12 in long, 9 in radius Shape) Smooth Test Elbow 410 - No Vanes (Segmented w/1 simulated curved Lean connector) | (0.0500) | 27.26 | (0.0546) |
| 16 | 1-Conn. Lean Duct Elbow 710 12 in long, 9 in radius Connector | (0.0625) | 69.44 | (0.0610) |
| 16 | 1-Conn. Lean Duct Elbow 710 12 in long, 12 in radius Connector | (0.0750) | 69.44 | (0.0735) |
| 8 | Sq. Th. Elbow 110, 2" Single Vanes | (0.0425) | 30.00 | (0.0467) |
| 17 | (12 in long, 9 in radius Shape) Smooth Test Elbow 410 w/Vanes | (0.0440) | 27.26 | (0.0486) |

TABLE 4-continued

1,200-1,400 FPM Velocity, Exhaust Duct Test

| FIG. | Description | Test Static Pressure Loss in inches w.c. | Length of Elbow in inches | Normalized Pressure Loss |
|---|---|---|---|---|
|  | (Segmented w/1 simulated curved Lean connector) |  |  |  |
| 17 | (12 in long, 12 in radius Shape) Smooth Test Elbow 410 - w/Vanes (Segmented w/1 simulated curved Lean connector) | (0.0450) | 27.26 | (0.0496) |
| 16 | 1-Conn. Lean Duct Elbow 710 w/Vanes 12 in long, 9 in radius Connector | (0.0400) | 69.44 | (0.0385) |

TABLE 5

1,500-1,600 FPM Velocity, Exhaust Duct Test

| FIG. | Description | Test Static Pressure Loss in inches w.c. | Length of Elbow in inches | Normalized Pressure Loss |
|---|---|---|---|---|
| 4 | Straight Duct 20 | (0.0620) | 59.00 | (0.0620) |
| 2 | Traditional - 1.5 W Radius Elbow 10 | (0.0750) | 42.40 | (0.0805) |
| 19 | 1.5 W Shape Smooth Test Elbow 610 (Segmented w/2 simulated curved Lean Connectors) | (0.0780) | 42.40 | (0.0835) |
| 18 | 2-Conn. Lean Duct Elbow 715 | (0.0900) | 72.25 | (0.0856) |
| 6 | 1.0 W Short Radius Elbow 210 | (0.0940) | 28.26 | (0.1042) |
| 19 | 1.0 W Shape Smooth Test Elbow 610 (Segmented w/2 simulated curved Lean Connectors) | (0.0880) | 28.26 | (0.0982) |
| 18 | 2-Conn. Lean Duct Elbow 715 | (0.0900) | 72.25 | (0.0856) |
| 8 | Sq. Th. Elbow 110 - No Vanes | (0.2420) | 30.00 | (0.2516) |
| 17 | (12 in long, 12 in radius Shape) Smooth Test Elbow 410 - No Vanes (Segmented w/1 simulated curved Lean connector) | (0.1140) | 27.26 | (0.1245) |
| 17 | (12 in long, 9 in radius Shape) Smooth Test Elbow 410 - No Vanes (Segmented w/1 simulated curved Lean connector) | (0.1150) | 27.26 | (0.1255) |
| 16 | 1-Conn. Lean Duct Elbow 710 9 in long, 8 in radius Connector | (0.1175) | 66.44 | (0.1150) |
| 16 | 1-Conn. Lean Duct Elbow 710 9 in long, 12 in radius Connector | (0.1225) | 66.44 | (0.1200) |
| 16 | 1-Conn. Lean Duct Elbow 710 9 in long, 6 in radius Connector | (0.1325) | 66.44 | (0.1300) |
| 8 | Sq. Th. Elbow 110, 2" Single Vanes | (0.0820) | 30.00 | (0.0916) |
| 17 | (12 in long, 9 in radius Shape) Smooth Test Elbow 410 w/Vanes (Segmented w/1 simulated curved Lean connector) | (0.0740) | 27.26 | (0.0845) |
| 17 | (12 in long, 12 in radius Shape) Smooth Test Elbow 410 - w/Vanes (Segmented w/1 simulated curved Lean connector) | (0.0770) | 27.26 | (0.0875) |
| 16 | 1-Conn. Lean Duct Elbow 710 w/Vanes 9 in long, 8 in radius Connector | (0.0725) | 66.44 | (0.0700) |
| 16 | 1-Conn. Lean Duct Elbow 710 w/Vanes 9 in long, 6 in radius Connector | (0.0725) | 66.44 | (0.0700) |
| 16 | 1-Conn. Lean Duct Elbow 710 w/Vanes 9 in long, 12 in radius Connector | (0.0725) | 66.44 | (0.0700) |

TABLE 6

2,100-2,300 FPM Velocity, Exhaust Duct Test

| FIG. | Description | Test Static Pressure Loss in inches w.c. | Length of Elbow in inches | Normalized Pressure Loss |
|---|---|---|---|---|
| 4 | Straight Duct 20 | (0.1050) | 59.00 | (0.1050) |
| 2 | Traditional - 1.5 W Radius Elbow 10 | (0.1380) | 42.40 | (0.1473) |
| 19 | 1.5 W Shape Smooth Test Elbow 610 (Segmented w/2 simulated curved Lean Connectors) | (0.1400) | 42.40 | (0.1493) |
| 18 | 2-Conn. Lean Duct Elbow 715 | (0.1750) | 72.25 | (0.1676) |
| 6 | 1.0 W Short Radius Elbow 210 | (0.1650) | 28.26 | (0.1823) |
| 19 | 1.0 W Shape Smooth Test Elbow 610 (Segmented w/2 simulated curved Lean Connectors) | (0.1575) | 28.26 | (0.1748) |
| 18 | 2-Conn. Lean Duct Elbow 715 | (0.1750) | 72.25 | (0.1676) |
| 8 | Sq. Th. Elbow 110 - No Vanes | (0.3800) | 30.00 | (0.3963) |
| 17 | (12 in long, 12 in radius Shape) Smooth Test Elbow 410 - No Vanes (Segmented w/1 simulated curved Lean connector) | (0.1850) | 27.26 | (0.2028) |
| 17 | (12 in long, 9 in radius Shape) Smooth Test Elbow | (0.2000) | 27.26 | (0.2178) |

TABLE 6-continued 2,100-2,300 FPM Velocity, Exhaust Duct Test

| FIG. | Description | Test Static Pressure Loss in inches w.c. | Length of Elbow in inches | Normalized Pressure Loss |
|---|---|---|---|---|
| | 410 - No Vanes (Segmented w/1 simulated curved Lean connector) | | | |
| 16 | 1-Conn. Lean Duct Elbow 710 9 in long, 6 in radius Connector | (0.2200) | 66.44 | (0.2158) |
| 16 | 1-Conn. Lean Duct Elbow 710 9 in long, 12 in radius Connector | (0.2300) | 66.44 | (0.2258) |
| 16 | 1-Conn. Lean Duct Elbow 710 9 in long, 8 in radius Connector | (0.2300) | 66.44 | (0.2258) |
| 8 | Sq. Th. Elbow 110, 2" Single Vanes | (0.1450) | 30.00 | (0.1613) |
| 17 | (12 in long, 9 in radius Shape) Smooth Test Elbow 410 w/Vanes (Segmented w/1 simulated curved Lean connector) | (0.1250) | 27.26 | (0.1428) |
| 17 | (12 in long, 12 in radius Shape) Smooth Test Elbow 410 - w/Vanes (Segmented w/1 simulated curved Lean connector) | (0.1300) | 27.26 | (0.1478) |
| 16 | 1-Conn. Lean Duct Elbow 710 w/Vanes 9 in long, 8 in radius Connector | (0.1500) | 66.44 | (0.1458) |
| 16 | 1-Conn. Lean Duct Elbow 710 w/Vanes 9 in long, 6 in radius Connector | (0.1500) | 66.44 | (0.1458) |
| 16 | 1-Conn. Lean Duct Elbow 710 w/Vanes 9 in long, 12 in radius Connector | (0.1500) | 66.44 | (0.1458) |

Conventional wisdom in duct design holds that square throat elbows 110 provide adequate pressure drop control, short radius elbows 210 (inside radius 16 equals width 22) provide better static pressure drops, and traditional (long) radius elbows 10 (inside radius 16 equals and half times the width 22) provide the best (lowest static pressure drops. Our test results, tabulated above, show this to be generally true.

Similarly, to improve the performance of square throat elbows 110, installers add a variety of turning vanes. Test results showed that, surprisingly, a square throat elbow 110 with 2-inch single skin vanes 342 often performed. better than the short radius elbows 210.

The results in the tables are grouped to show how the Lean Duct elbows compare with the traditional radius elbow 10, the short radius elbow 210, the square throat elbow 110, and a square throat elbow 110 with turning vanes.

The test results show that the specially fabricated segmented elbows 610 performed as well as or better than both the traditional radius elbow and the short radius elbow 210. Further, the Lean Duct elbows 710 with a single 45-degree connector 708 performed better than the square throat elbows 10 and comparably to the short radius elbows 210. Lean Duct elbows 715 with two 22.5-degree radius connectors 708 performed comparably to both the short radius elbows 210 and the traditional radius elbows 10. Test results are also shown for the specially constructed segmented elbows 410, which in all cases performed as well or better than a comparable square throat elbow. The length of the inside radius 716 had noticeable effect on the pressure drop. Since inside radii 716 of the individual radius connectors 708 do not need to be closely matched to the size of the elbow, connector strips can be mass-produced and stockpiled on the job site, where the ends can be cut with a single tool designed for that purpose. All tested radius connectors 708 were constructed using the tab seams illustrated in FIG. 23.

Finally, because of the significant performance improvement seen in the square throat elbow 110 with the additional of single skin turning vanes 342, Lean Duct elbows 710 were also tested with single skin turning vanes 342. The addition of the single skin turning vanes 342 improved the performance of the Lean Duct elbow 710 up to 20 percent. The design engineer would determine if this improvement would justify the additional expense of turning vanes Overall, the test results show that Lean Duct Manufacturing elbows can be substituted for expensive manufactured elbows and provide comparable performance.

It is demonstrated that Lean Duct Manufacturing elbows offer a significant. improvement over square throat elbows and are comparable in performance to radius elbows. It will be understood that certain features and subcombinations of the invention are useful and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not limiting. For example, the various items illustrated may be constructed to form different angles or rearranged to form offsets rather than elbows. Segmented fittings may be produced without the use of Lean Duct Connectors 708. With slight modifications, changes in size of the duct may also be accomplished. Even reducing offsets may be constructed.

Further, while much of the foregoing has been described in terms of ventilation air duct, the invention is suitable for conveying other materials and can be used in other situations. it is intended to include these and other modifications and variations as will occur to those of skill of the art in the claims that follow.

Similarly, certain dimensions are shown in the drawings and description for convenience and clarity, but this invention is not limited to any particular set of dimensions. Similarly, the present invention is not limited to the above-described means of assembly, but encompasses other means such as extrusion of finished parts. The proper scope of the invention should be determined by the broadest interpretation of the following claims so as to encompass all such modifications and equivalents.

What is claimed is:

1. A duct with at least one section of ductwork comprising:
a first pair of faces spaced apart, each of said first pair of faces including two curved edges opposite each other;
a pair of curved faces spaced apart, wherein said curved faces are of substantially equal length, said curved faces are formed into substantially identical curvilinear shapes substantially parallel to each other, said curved faces are generally at right angles to the first pair of faces, said curvilinear shapes are formed to mate with the curved edges of the first pair of faces; and said curved faces are joined to the curved edges of the first pair of faces, defining an interior flow area for fluid flow.

2. The duct as in claim 1, wherein the duct is joined to at least one additional section of ductwork to make a ductwork system.

* * * * *